United States Patent
Patel et al.

(10) Patent No.: US 11,882,214 B2
(45) Date of Patent: Jan. 23, 2024

(54) TECHNIQUE FOR CRYPTOGRAPHIC DOCUMENT PROTECTION AND VERIFICATION

(71) Applicant: Telefonaktiebolaget LM Ericsson (publ), Stockholm (SE)

(72) Inventors: Dhruvin Patel, Aachen (DE); Thomas Weidenfeller, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 422 days.

(21) Appl. No.: 17/311,554

(22) PCT Filed: Dec. 6, 2018

(86) PCT No.: PCT/EP2018/083788
§ 371 (c)(1),
(2) Date: Jun. 7, 2021

(87) PCT Pub. No.: WO2020/114597
PCT Pub. Date: Jun. 11, 2020

(65) Prior Publication Data
US 2022/0029792 A1    Jan. 27, 2022

(51) Int. Cl.
*H04L 9/08* (2006.01)
*G06F 21/64* (2013.01)
*H04L 9/32* (2006.01)

(52) U.S. Cl.
CPC ............. *H04L 9/088* (2013.01); *G06F 21/64* (2013.01); *H04L 9/3236* (2013.01)

(58) Field of Classification Search
CPC ........ H04L 9/088; H04L 9/3236; G06F 21/64
See application file for complete search history.

(56) References Cited

U.S. PATENT DOCUMENTS

| | | | |
|---|---|---|---|
| 7,197,644 B2* | 3/2007 | Brewington | H04N 1/32133 380/243 |
| 9,722,790 B2* | 8/2017 | Ebrahimi | H04L 9/3252 |

(Continued)

FOREIGN PATENT DOCUMENTS

| WO | 2016179334 A1 | 11/2016 |
|---|---|---|
| WO | 2017136879 A1 | 8/2017 |

OTHER PUBLICATIONS

Author Unknown, "Universal Mobile Telecommunications System (UMTS); LTE; Bootstrapping interface (Ub) and network application function interace (Ua); Protocol details," Technical Specification 124.109, Version 15.0.0, Release 15, Jun. 2018, ETSI, 82 pages.

(Continued)

*Primary Examiner* — Gary S Gracia
(74) *Attorney, Agent, or Firm* — Withrow & Terranova, PLLC

(57) ABSTRACT

A technique for controlling cryptographic document protection and verification is presented. In one implementation, a device is associated with a device identifier and with a cryptographic key is configured to obtain an electronically processable document representation (EPDR) of content of a document that is to be protected and to apply the cryptographic key to the EPDR to obtain a cryptographically processed document representation (CPDR). The device is further configured to transmit the device identifier and a verification parameter comprising at least one of the EPDR and the CPDR towards a transaction server that is configured to log the device identifier and the verification parameter in a tamper-proof manner. The device is also configured to receive a transaction identifier associated with the device identifier and the verification parameter from the transaction server, and trigger printing of the transaction identifier and (Continued)

the CPDR on a physical document that corresponds to the EPDR.

16 Claims, 15 Drawing Sheets

(56) References Cited

U.S. PATENT DOCUMENTS

| | | | | |
|---|---|---|---|---|
| 10,719,501 | B1* | 7/2020 | Leise | G06Q 30/0611 |
| 2006/0265590 | A1 | 11/2006 | DeYoung et al. | |
| 2006/0271787 | A1 | 11/2006 | DeYoung et al. | |
| 2010/0325050 | A1* | 12/2010 | Ito | B41M 5/00 |
| | | | | 283/73 |
| 2014/0254796 | A1* | 9/2014 | Li | H04L 9/3263 |
| | | | | 380/246 |
| 2015/0347719 | A1* | 12/2015 | Pathak | G06F 21/6209 |
| | | | | 726/28 |
| 2016/0134642 | A1* | 5/2016 | Hamid | H04L 63/045 |
| | | | | 713/160 |
| 2016/0267603 | A1* | 9/2016 | Wolch | G06Q 30/0601 |
| 2017/0177855 | A1* | 6/2017 | Costa Faidella | H04L 9/3247 |
| 2018/0247306 | A1* | 8/2018 | Dowty | G06Q 20/385 |
| 2018/0248699 | A1* | 8/2018 | Andrade | H04L 9/0897 |
| 2018/0315117 | A1* | 11/2018 | Jephcott | G06T 13/40 |
| 2018/0343120 | A1* | 11/2018 | Andrade | H04L 9/0637 |
| 2019/0268162 | A1* | 8/2019 | Sahagun | H04L 9/3236 |
| 2019/0373137 | A1* | 12/2019 | Krukar | H04N 1/444 |
| 2020/0005293 | A1* | 1/2020 | Opeola | G06Q 20/065 |
| 2020/0082139 | A1* | 3/2020 | Peeters | G01N 33/5302 |
| 2020/0220985 | A1* | 7/2020 | Keery | H04N 1/00949 |
| 2020/0234267 | A1* | 7/2020 | Sanders | G06Q 20/209 |
| 2020/0258428 | A1* | 8/2020 | Forte | H04L 9/50 |
| 2020/0311646 | A1* | 10/2020 | Koenig | H04L 9/3297 |
| 2021/0006411 | A1* | 1/2021 | Shaked | H04L 9/3231 |
| 2021/0037009 | A1* | 2/2021 | Yang | H04L 63/0861 |
| 2021/0042830 | A1* | 2/2021 | Burke | G06Q 20/384 |
| 2021/0192084 | A1* | 6/2021 | Wilbrecht | H04L 9/0643 |
| 2021/0279727 | A1* | 9/2021 | Buldas | G06F 21/64 |
| 2021/0279736 | A1* | 9/2021 | Sun | H04L 9/50 |
| 2021/0319083 | A1* | 10/2021 | Bernardi | H04L 51/10 |
| 2021/0335041 | A1* | 10/2021 | Haslam | G16H 50/50 |
| 2021/0346091 | A1* | 11/2021 | Haslam | G16H 30/40 |
| 2022/0029792 | A1* | 1/2022 | Patel | H04L 9/3236 |
| 2022/0078181 | A1* | 3/2022 | Brito | G06F 3/1222 |

OTHER PUBLICATIONS

Author Unknown, "Digital cellular telecommunications system (Phase 2+) (GSM); Universal Mobile Telecommunications System (UMTS); LTE; Generic Authentication Architecture (GAA); Generic Bootstrapping Architecture (GBA)," Technical Specification 133. 220, Version 15.3.0, Oct. 2018, ETSI, 95 pages.

Author Unknown, "Digital cellular telecommunications system (Phase 2+) (GSM); Universal Mobile Telecommunications System (UMTS); LTE; Generic Authentication Architecture (GAA); Support for subscriber certificates," Technical Specification 133.221, Version 15.0.0, Jul. 2018, ETSI, 26 pages.

Author Unknown, "Technical Specification Group Services and System Aspects; 3G Security; Generic Authentication Architecture (GAA); System description (Release 15)," Technical Report 33.919, Version 15.0.0, Jun. 2018, 17 pages.

International Search Report and Written Opinion for International Patent Application No. PCT/EP2018/083788, dated Aug. 5, 2019, 10 pages.

* cited by examiner $X_i = H_i$ or $S_i$
$H$ = Hash, $S$ = Signature
$X_{Yi}$ = Hash or Signature derived from $Y=S_i$ or $Y=H_i$
$A_{i,j}$ = relation between $X_i$ and $X_j$

TECHNIQUE FOR CRYPTOGRAPHIC DOCUMENT PROTECTION AND VERIFICATION

This application is a 35 U.S.C. § 371 national phase filing of International Application No. PCT/EP2018/083788, filed Dec. 6, 2018, the disclosure of which is incorporated herein by reference in its entirety.

TECHNICAL FIELD

The present disclosure generally relates to cryptography. In particular, a technique for cryptographically protecting a physical document and for verifying the cryptographic protection is presented. The technique may be practiced in the form of devices, servers, systems, methods and software.

BACKGROUND

The integrity and authenticity of physical documents has historically been protected by personally signing the documents using a pen or another writing tool. However, keeping track of personal signatures performed, for example, by individual doctors on prescriptions is a challenging task. Also, such personal signatures can easily be forged.

In order to increase integrity and authenticity of physical documents, and to reduce the risk of forgery, personal signatures can be combined with marking the signed document with mechanical stamps (e.g., stamps identifying the authority on behalf of which the document is signed). Usage of such a mechanical stamp can, however, not easily be recorded. Moreover, a stamped and signed document only indicates that the signer was in possession of the stamp. It does not, without an additional signature of a witness, guarantee the identity of the signer and, thus, authenticity.

A specific challenge is document integrity. Unless every page of a physical document is signed, or the pages of the document are stapled such that they cannot be exchanged without destroying the document as a whole, there is the risk that portions of the document are fraudulently replaced.

Given the data processing techniques and cryptographic algorithms that became widespread over the last decade, it would be desirable to utilize the underlying concepts also for the cryptographic protection of a physical document and its verification.

SUMMARY

There is a need for a technique that permits an efficient and secure cryptographic protection of a physical document and its verification.

According to a first aspect, a device for controlling cryptographic document protection is presented, wherein the device is associated with a device identifier and with a cryptographic key. The device is configured to obtain an electronically processable document representation (EPDR) of content of a document that is to be protected and to apply the cryptographic key to the EPDR to obtain a cryptographically processed document representation (CPDR). The device is further configured to transmit the device identifier and a verification parameter comprising at least one of the EPDR and the CPDR towards a transaction server that is configured to log the device identifier and the verification parameter in a tamper-proof manner, to receive a transaction identifier associated with the device identifier and the verification parameter, and to trigger printing of the transaction identifier and the CPDR on a physical document that corresponds to the EPDR.

The device may be a mobile device (e.g., a smartphone or a tablet computer) or a stationary device (e.g., a personal computer). The device may be configured to attach to a communication network using a wired or wireless connection technique. The device may be configured to attach to one or both of a printer and a scanner. The scanner may be a stand-alone component or integrated into the device. The printer may be a stand-alone component or integrated into the device.

One or more or all of the EPDRs presented herein may correspond to (e.g., include, consist of or be derived from) one of content of the associated document and content of the associated document to which a cryptographic one-way function has been applied. One or more or all of the CPDRs presented herein may correspond to (e.g., include, consist of or be derived from) a signed or encrypted version of an associated EPDR. From the CPDR, the associated EPDR may be derived using a suitable cryptographically inverse operation (e.g., by decryption or by positively verifying a signature).

The EPDR may take the form of a character string that can be representative of an alpha-numerical value (e.g., a hash value). The CPDR may take the form of a character string that can be representative of an alpha-numerical value (e.g., a signature value).

The EPDR may be based on an electronic file that is based on a scan of the physical document generated prior to printing. The EPDR may be based on an electronic file of the document generated by text processing. The EPDR may have any file format, including PDF, WORD, JPEG, TIFF, and so on.

The device may comprise a scanner configured to provide the scan of the physical document. The scanner may be integrated into the device. The scanner may be configured in the form of a camera (e.g., as integrated into portable computing devices such as tablet PCs or smartphones), in the form of a flatbed scanner, or otherwise.

The EPDR may be obtained by applying a cryptographic one-way function to the electronic file or content thereof. The cryptographic one-way function may be a cryptographic hash function.

The device may comprise a printer configured to print the transaction identifier and the CPDR on the physical document. The printer may be integrated into the device.

The cryptographic key may correspond to or may be derived from a private key associated with the device. The private key may be stored in a tamper-proof memory of the device. As an example, the private key may be stored in the memory of a universal integrated circuit card (UICC), such as a subscriber identification module (SIM), card or in an electronic SIM (eSIM). In some variants, the private key is obtained from a network application function, NAF, entity acting as public key infrastructure, PKI, portal. In some variants, the public key may be included in a certificate of a user of the user device (e.g., in a subscriber certificate).

The cryptographic key may correspond to or may be derived from a common secret key shared between the device and a network entity (also called shared secret key). The device may be configured to trigger or perform a generic bootstrapping architecture (GBA) procedure to create the common secret key. The GBA procedure may result in (e.g., produce) one or more cryptographic parameters that are to be used by the device to create the common secret key. In such a case, the device may be configured to transmit the one or more cryptographic parameters towards the transaction server.

The device identifier may be an Internet Protocol Multimedia Private Identity, IMPI, of the device. Of course, the device identifier could also be based on a proprietary solution.

According to another aspect, a first device for controlling verification of a cryptographically protected physical document is provided. The first device is configured to obtain the following:
 a first EPDR of content of the cryptographically protected physical document to be verified,
 a first CPDR printed on the physical document, and
 a transaction identifier printed on the physical document and being associated with a device identifier of a second device that triggered cryptographic protection of the physical document.

The first device is also configured to send the transaction identifier towards a transaction server and to receive, from the transaction server, transaction information comprising the device identifier associated with the transaction, wherein
 a first verification parameter set comprises at least one of the first CPDR and a second EPDR obtained by applying a first cryptographic key associated with the device identifier to the first CPDR;
 a second verification parameter set comprises at least one of the first EPDR and a second CPDR obtained by applying a second cryptographic key associated with the device identifier to the first EPDR; and
 a third verification parameter set comprises at least one of a third EPDR of the original document that was to be protected and a third CPDR derived by applying a third cryptographic key associated with the device identifier to the third EPDR, wherein the third parameter set is received with the transaction information.

The first device is also configured to trigger verification of the physical document based on a parameter correspondence between the first parameter set, the second parameter set and the third parameter set.

The first device will typically be different from the second device. It may, however, also be the same device.

The parameter correspondence may be verified by a pairwise analysis of the three parameter sets in regard to identical parameters. In this regard, the parameter types CPDR and EPDR may be taken into account, as well as the corresponding parameter values. If for at least two different pair a parameter correspondence can be found, the verification may be regarded as having been successful.

One or more or all of the EPDRs presented herein may correspond to (e.g., include, consist of or be derived from) one of content of the associated document and content of the associated document to which a cryptographic one-way function has been applied. One or more or all of the CPDRs presented herein may correspond to (e.g., include, consist of or be derived from) a signed or encrypted version of the associated EPDR. From the CPDR, the associated EPDR may be generated using a suitable cryptographically inverse operation (e.g., by decryption or by positively verifying a signature).

The first EPDR of the cryptographically protected physical document may be based on an electronic document that, in turn, is based on a scan of the cryptographically protected physical document. To this end, the first device may comprise a scanner configured to provide the scan of the physical document, as explained above. The scan of the physical document may have been processed so that the first EPDR does not include the first CPDR and the transaction identifier printed on the physical document. To this end, image processing techniques may be applied.

The first cryptographic key may correspond to or may be derived from a public or a common secret key of the second device. Additionally, or in the alternative, the second cryptographic key may correspond to or may be derived from a common secret key associated with the second device.

Triggering verification of the physical document may comprise transmitting a key request for the public key, wherein the key request contains the device identifier. Triggering verification may further comprise receiving, in response to the key request, the public key, and applying the public key to the first CPDR so as to obtain the second EPDR. The first device may transmit the key request to a NAF.

At least one of the first cryptographic key and the second cryptographic key may correspond to or may be derived from a shared secret key, shared between the second device and a network entity. In such a case, triggering verification of the physical document may comprise triggering the following steps:
 transmitting a key request containing the device identifier and one or more cryptographic parameters received with the transaction information and used by the second device for calculation of the first cryptographic key;
 receiving, in response to the key request, the common secret key; and
 applying the common secret key to at least one of the one or more cryptographic parameters received with the transaction information so as to obtain the second cryptographic key.

Triggering verification of the physical document may in particular comprise triggering application of the first cryptographic key to the first CPDR to obtain the second EPDR. Triggering verification of the physical document may comprise triggering application of the second cryptographic key to the first EPDR to obtain the second CPDR.

The first device may be configured to trigger the verification by sending a triggering message to a NAF of a GBA system. The triggering message may include at least one of the device identifier, the first EPDR, the first CPDR, and the one or more cryptographic parameters. The one or more cryptographic parameters may originally have been utilized by the second device in the context of cryptographically protecting the physical document.

A still further aspect relates to a transaction server configured to log a cryptographic document protection transaction. The transaction server is configured to receive transaction information comprising a device identifier and at least one of an EPDR of content of a document that is to be protected and a CPDR, wherein the CPDR has been obtained by a device associated with the device identifier by applying a cryptographic key associated with the device to the EPDR. The transaction server is further configured to assign a transaction identifier to the transaction information, to transmit the transaction identifier towards the device, and to log the transaction information in a tamper-proof manner in a data structure.

The data structure may be a blockchain. The transaction information may be logged in a data block of the blockchain. The transaction server may be configured to create a new data block after each lapse of a predetermined period of time.

The transaction information may comprise one or more of:
- location information indicative of the location where the device has applied the cryptographic key;
- a time stamp indicative of the point in time when the device has applied the cryptographic key;
- the device identifier in the form of an IMPI of the device; and
- at least one cryptographic parameter used by the device for calculation of the cryptographic key.

According to a still further aspect, a transaction server that logs transaction information pertaining to a plurality of cryptographic document protection transactions in a data structure is presented, wherein the transaction information comprises for each transaction a device identifier and at least one of an EPDR of content of a document that is to be protected and a CPDR, wherein the CPDR has been obtained by a first device associated with the device identifier by applying a cryptographic key associated with the first device to the EPDR. The transaction server is configured to receive a transaction identifier printed on a physical document and obtained by a second device from the physical document, to access the data structure to identify the transaction information associated with the transaction identifier, and to return at least a portion of the identified transaction information.

Also provided is a verification device configured to verify a cryptographically protected document on which a first CPDR is printed, wherein the first CPDR is based on a first cryptographic key associated with a first device having been applied to a first EPDR of content of the physical document to be verified. The verification device is configured to receive a verification request comprising a device identifier associated with the first device, the first CPDR, the first EPDR, and a set of cryptographic parameters used by the first device for calculation of the first cryptographic key. The verification device is also configured to transmit a key request comprising the device identifier and the at least one cryptographic parameter, to receive a second cryptographic key generated on the basis of the at least one cryptographic parameter and a secret key associated with the device identifier and to apply the second cryptographic key to at least one of the cryptographic parameters to derive a third cryptographic key. The verification device is configured to apply the third cryptographic key to at least one of the first CPDR so as to obtain a second EPDR and the first EPDR so as to obtain a second CPDR, wherein
- a first verification parameter set comprises at least one of the first CPDR and the second EPDR;
- a second verification parameter set comprises at least one of the first EPDR and the second CPDR; and
- a third parameter set comprises at least one of a third EPDR of the original document that was to be protected and a third CPDR derived by applying a fourth cryptographic key associated with the device identifier to the third EPDR, wherein the third parameter set is received with the verification request.

The verification device is also configured to verify the physical document based on a parameter correspondence between the first parameter set, the second parameter set and the third parameter set.

The verification device may be configured to operate as a bootstrapping server function (BSF) and to interface with a NAF for reception of the verification request and a home subscriber system (HSS) for transmission of the key request and reception of the second key.

A cryptographic document protection system according to one aspect comprises the device, in particular the second device, presented herein and the transaction server presented herein.

Another cryptographic document protection system comprises the first device presented herein and at least one of the transaction server and the verification device presented herein.

Also provide is a method of controlling cryptographic document protection, the method being performed by a device that is associated with a device identifier and with a cryptographic key and comprising obtaining an EPDR of content of a document that is to be protected, applying the cryptographic key to the EPDR to obtain a CPDR, and transmitting the device identifier and a verification parameter comprising at least one of the EPDR and the CPDR towards a transaction server that is configured to log the device identifier and the verification parameter in a tamper-proof manner. The method also comprises receiving a transaction identifier associated with the device identifier and the verification parameter and triggering printing of the transaction identifier and the CPDR on a physical document that corresponds to the EPDR.

Additionally, a method is provided of controlling verification of a cryptographically protected physical document, the method being performed by a first device and comprising obtaining the following:
- a first EPDR of content of the cryptographically protected physical document to be verified,
- a first CPDR printed on the physical document, and
- a transaction identifier printed on the physical document and being associated with a device identifier of a second device that triggered cryptographic protection of the physical document.

The method also comprises sending the transaction identifier towards a transaction server and receiving, from the transaction server, transaction information comprising the device identifier associated with the transaction, wherein
- a first verification parameter set comprises at least one of the first CPDR and a second EPDR obtained by applying a first cryptographic key associated with the device identifier to the first CPDR; and
- a second verification parameter set comprises at least one of the first EPDR and a second CPDR obtained by applying a second cryptographic key associated with the device identifier to the first EPDR; and
- a third verification parameter set comprises at least one of a third EPDR of the original document that was to be protected and a third CPDR derived by applying a third cryptographic key associated with the device identifier to the third EPDR, wherein the third parameter set is received with the transaction information.

The method also comprises triggering verification of the physical document based on a parameter correspondence between the first parameter set, the second parameter set and the third parameter set.

A further method directed at operating a transaction server configured to log a cryptographic document protection transaction comprises receiving transaction information comprising a device identifier and at least one of an EPDR of content of a document that is to be protected and a CPDR, wherein the CPDR has been obtained by a device associated with the device identifier by applying a cryptographic key associated with the device to the EPDR. The method further comprises assigning a transaction identifier to the transaction information, transmitting the transaction identifier towards the device, and logging the transaction information in a tamper-proof manner in a data structure.

Further provided is a method of operating a transaction server that logs transaction information pertaining to a plurality of cryptographic document protection transactions in a data structure, the transaction information comprising for each transaction a device identifier and at least one of an EPDR of content of a document that is to be protected and a CPDR, wherein the CPDR has been obtained by a first device associated with the device identifier by applying a cryptographic key associated with the first device to the EPDR. The method comprises receiving a transaction identifier printed on a physical document and obtained by a second device from the physical document, accessing the data structure to identify the transaction information associated with the transaction identifier, and returning at least a portion of the identified transaction information.

Still further a method is provided of operating a verification device configured to verify a cryptographically protected document on which a first CPDR is printed, wherein the first CPDR is based on a first cryptographic key associated with a first device having been applied to a first EPDR of content of the physical document to be verified. The method comprises receiving a verification request comprising a device identifier associated with the first device, the first CPDR, the first EPDR, and a set of cryptographic parameters used by the first device for calculation of the first cryptographic key. The method also comprises transmitting a key request comprising the device identifier and the at least one cryptographic parameter and receiving a second cryptographic key generated on the basis of the at least one cryptographic parameter and a secret key associated with the device identifier. The method further comprises applying the second cryptographic key to at least one of the cryptographic parameters to derive a third cryptographic key and applying the third cryptographic key to at least one of the first CPDR so as to obtain a second EPDR and the first EPDR so as to obtain a second CPDR, wherein a first verification parameter set comprises at least one of the first CPDR and the second EPDR;

a second verification parameter set comprises at least one of the first EPDR and the second CPDR; and a third parameter set comprises at least one of a third EPDR of the original document that was to be protected and a third CPDR derived by applying a fourth cryptographic key associated with the device identifier to the third EPDR, wherein the third parameter set is received with the verification request.

Still further, the method comprises verifying the physical document based on a parameter correspondence between the first parameter set, the second parameter set and the third parameter set.

Also provided is a computer program product configured to perform the steps of the method aspects presented herein when the computer program product is executed on one or more processors. The computer program product may be stored on a computer readable recording medium or may be provided for download via a network connection.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
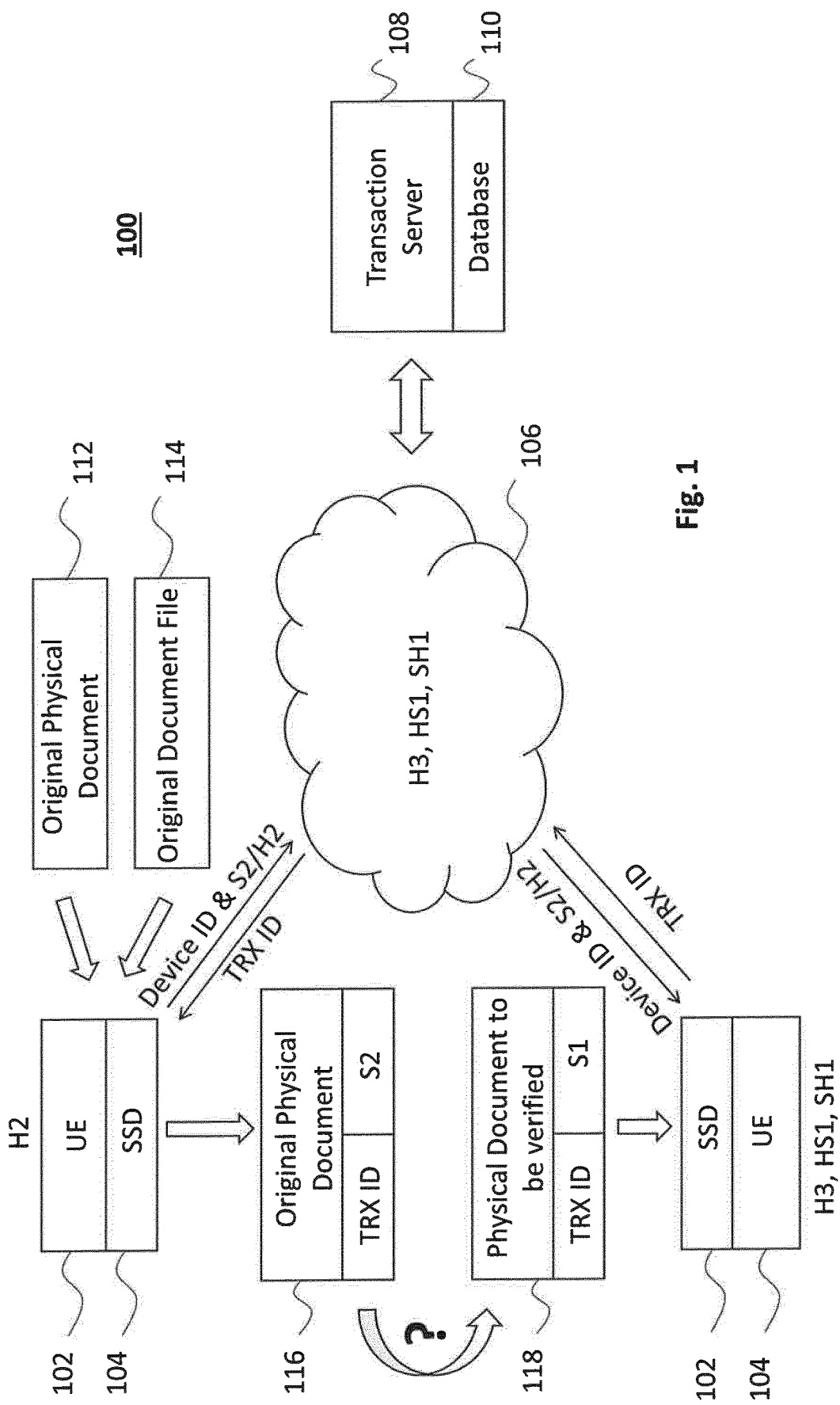
FIG. 1 is a diagram illustrating a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on exemplary cryptographic algorithms and exemplary algorithmic details, the present disclosure is not limited in this regard. For example, certain cryptographic aspects will exemplarily be described in the context of GBA, but other cryptographic architectures could be used as well. Moreover, while a hash function will be discussed as an example of a cryptographic one-way function, those skilled in the art will be aware of other cryptographic one-way functions that could likewise be used.

Those skilled in the art will further appreciate that the steps, services and functions explained herein may be implemented using individual hardware circuits, using software (i.e., one or more computer programs) functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a network system 100 in which the present disclosure can be implemented. As shown in FIG. 1, the network system 100 comprises one or more user devices 102. The user devices 102 will also be denoted as user equipments (UEs), without limitation. The user devices 102 can be implemented as smartphones, tablet computers, personal computers, laptops, stationary computing stations, and so on.

The user devices 102 are configured to set up a wired or wireless connection to a communication network 106. At least portions of the communication network 106 may be compliant with specifications of the 3$^{rd}$ Generation Partnership Project (3GPP). Such 3GPP specifications may in particular relate to security (e.g., cryptographic key generation) mechanisms and mobile communication mechanisms.

In some implementations, the user devices 102 may be configured as UEs in accordance with the 3GPP specifications.

Each user device 102 is associated with a Scanning and Stamping Device (SSD) 104. The SSD 104 may be an integral part of the associated user device 102 or may be a separate entity connectable to the associated user device 102 via a wired or wireless connection. In one variant, there exists a point-to-point connection between the user device 102 and the SSD 104.

Figure 2B:
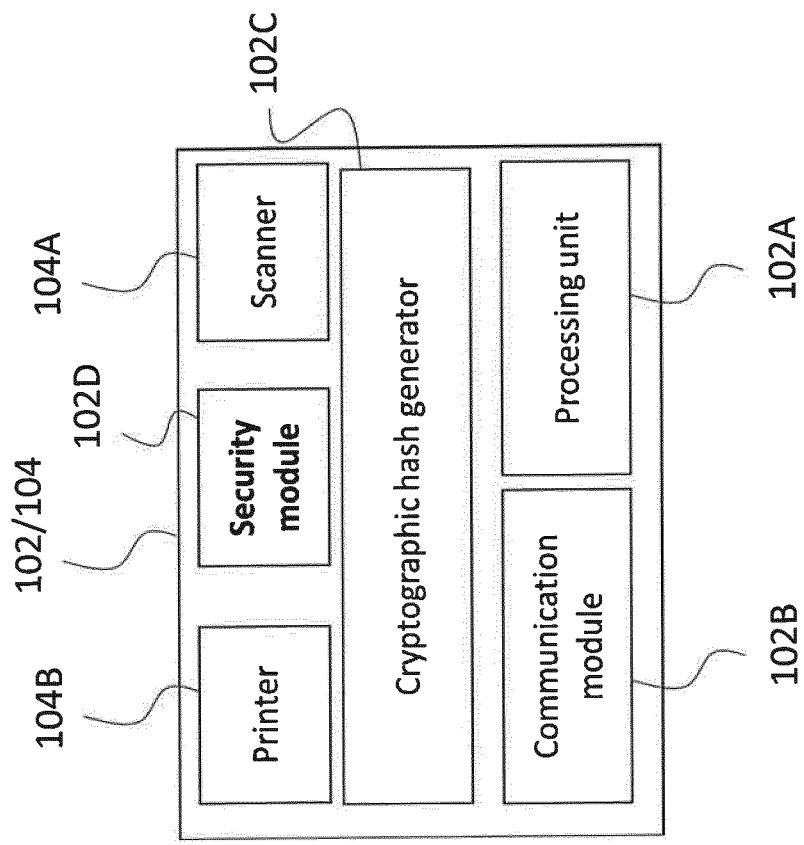
FIGS. 2A, 2B are block diagrams illustrating two user device embodiments of the present disclosure.
Figure 2A:
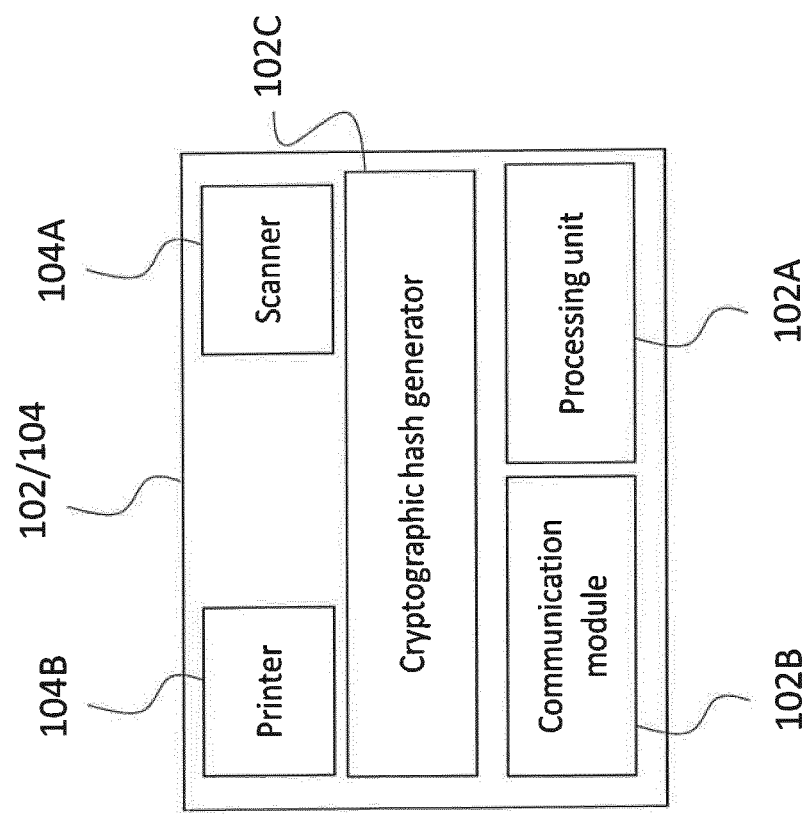

FIGS. 2A and 2B illustrate exemplary configurations of a user device 102 with an integrated SSD 104. As shown in FIGS. 2A and 2B, the SSD 104 comprises a scanning module 104A and a printing ("stamping") module 104B. The scanning module 104 is configured to generate a scan of a physical document. The scan may be generated in the form of an electronic file that permits extraction of its alpha-numerical document content (e.g., using optical character recognition, OCS). In some variants, the scanning module 104A may be realized in the form of a camera integrated into the user device 102 (e.g., a smartphone camera). In other variants, the scanning module 104A is configured as a flatbed scanner or otherwise. The printing module 104B is configured to print information on a physical document for cryptographic protection. In some variants, the printing module 104B is configured to print the physical document as a whole (i.e., including its content). The printing module 104B may be configured as a laser printer or an inkjet printer or otherwise. Given the miniaturization of printers, the printing module 104B may be integrated into a mobile user device 102.

It should be noted that depending on the use case, the SSD 104 may only include the scanning module 104A or may only include the printing module 104B. For example, the scanning module 104A may be omitted in case the document content becomes available as an electronic file that has been generated by text processing. On the other hand, the printing module 104B may be omitted in case there is no need to print the physical document as a whole or in case there is no need to print information on the physical document (e.g., because the physical document will only be verified, but not protected). For sake of consistency, the term SSD will also be used in case one of the scanning function and the printing function is missing.

As illustrated in FIGS. 2A and 2B, the user device 102 comprises a processing unit 102A with one or more processors, a communication module 102B to set up a network connection to the communication network 106 (e.g., in accordance with the 3GPP specifications), and a cryptographic hash generator 102C. The cryptographic hash generator 102C is configured to apply a cryptographic hash function to the electronic document file generated by the scanning module 104A or by text processing. In some variants, the cryptographic hash generator 102C may also be integrated into the SSD 104, which may then take the form of a stand-alone device.

With reference to FIG. 2B, the user device 102 may optionally comprise a tamper-proof security module 102D, such as a UICC. The UICC can take the form of a SIM card or an eSIM. The security module 102D is in charge of one or more of storing at least one secret cryptographic key (e.g., a private key associated with the user device 102), participating in one or more cryptographic key generation procedures (e.g., in accordance with 3GPP specifications and/or GBA procedures), and storing a device identifier, such as an IMPI.

Returning to FIG. 1, the network system 100 further comprises a transaction server 108 with an associated database 110 for storing information pertaining to document protection transactions in a dedicated data structure. The transaction server 108 may be implemented on a network node. In case the communication network 106 is (at least partially) operated by a mobile network operator (NMO), the network node implementing the transaction server 108 may also be operated by the MNO.

In one embodiment, the database 110 comprises a blockchain data structure. The database 110 may be replicated on multiple network nodes in accordance with the blockchain paradigm. A blockchain is a data structure made up from blocks (records) of data. In one implementation, a new block is created after a predefined time interval and inserted in the blockchain, which can be further published among all the nodes in the MNO network and, optionally, in networks of further NMOs.

The individual blocks in the block chain are linked (chained) together in a secure way using cryptography. The linking is performed via hash pointers in the blocks. A hash pointer is a data structure used to point to some information with a cryptographic hash of the information. Compared to a regular pointer, a hash pointer provides a possibility to verify that information was not altered or modified. In a technical sense, a blockchain is a data structure built using linked list of such hash pointers.

The main benefit of utilizing a blockchain is the provision of a tamper-evident data structure. For example, if someone changes the transaction data in one block, the hash of that whole block will be changed. This also means the hash of the last block in the blockchain will be changed, and this change enables to detect alteration of data in any one of the blocks. The main assumption here is that the cryptographic hash function used to create the hash has the property of being collision resistant. If an attacker wants to alter the data in one block which is in the middle of the chain, the attacker has to tamper all the hash pointers up to the beginning block. The distribution (i.e., replication) of a so-called ledger underlying the blockchain allows to detect such tampering.

As explained above, the blockchain data structure can belong to the MNO domain and is considered permissioned. A permissioned blockchain requires special rights to read, access and write information. The permissioned blockchain can be shared among the different MNOs based on the agreement.

In the following, the operation of the network system 100 of FIG. 1 with the user device 102 illustrated in FIGS. 2A and 2B will be described in more detail. It is to be noted that the user device 102 can take on two roles depending on whether it is operated to control cryptographic document protection or to verify a cryptographically protected physical document. The aspect of document protection will be described first with reference to the upper part of FIG. 1 and FIGS. 3 to 7. Then, the aspect of document verification will be described with reference to the lower part of FIG. 1 and FIGS. 8 to 15.

As illustrated in the upper part of FIG. 1, the document protection procedure can either be based on an original of a physical document 112 (e.g., a print-out) or on an electronic file 114 including the content of the physical document 112. The physical document 112 can be a print-out of the electronic file 114. The physical document 112 and the underlying electronic file 114 include document content that may have been generated by text processing or otherwise (e.g., by taking a picture with a camera of the user device 102 or of another device). As an example, the document content may define an agreement or contract between two or more parties. In such a case, each party may operate its own user device 102 in regard to a single physical document as described herein. The document content is not restricted to textual information but may alternatively, or in addition, include image information or other information Operation of the network system 100 and of the user device 102 in the context of creating a protected physical document 116 will now be described in more detail with reference to the upper part of FIG. 1 and the signaling diagram 300 of FIG. 3. It will in the following be assumed that the user device 102 is associated with a device identifier Device ID (e.g., an IMPI) and with a cryptographic key cK (e.g., a private key or a common secret key shared with an entity in the communication network 106). The cryptographic key cK may have been generated in a dedicated key generation procedure not illustrated in FIG. 3. As explained above, one or both of the device identifier Device ID and the cryptographic key cK may be stored in the security module 102D (see FIG. 2B) or elsewhere within the user device 102.

Initially, the user device 102 obtains an electronically processable document representation (i.e., an EPDR) of content of the document 112, 114 that is to be protected. The EPDR is in one variant based on the electronic file 114 of the document to be protected (that may not yet exist as a print-out). In another variant illustrated in FIG. 3, the physical document 112 is scanned in step S302 by the scanning module 104A of the SSD 104. Then, in step S304, a cryptographic hash function is applied to the electronic file generated by the scanning step S302 to obtain a hash value (or simply hash) H2. Alternatively, the hash function is applied to the electronic file 114 or its content to obtain H2. In this case, step S302 may be omitted.

For application of the cryptographic hash function in step S304, the electronic file may be regarded as a binary file (e.g., a sequence of bytes) that is processed using the cryptographic hash function. In general, the resulting hash H2 will have a significantly smaller size then the underlying electronic file.

Step S304 may be performed by the cryptographic hash generator 102C shown in FIGS. 2A and 2B. In case the SSD 104 and the user device 102 are separate components, step S304 may also be performed by the SSD 104, as illustrated in FIG. 3.

Figure 3:
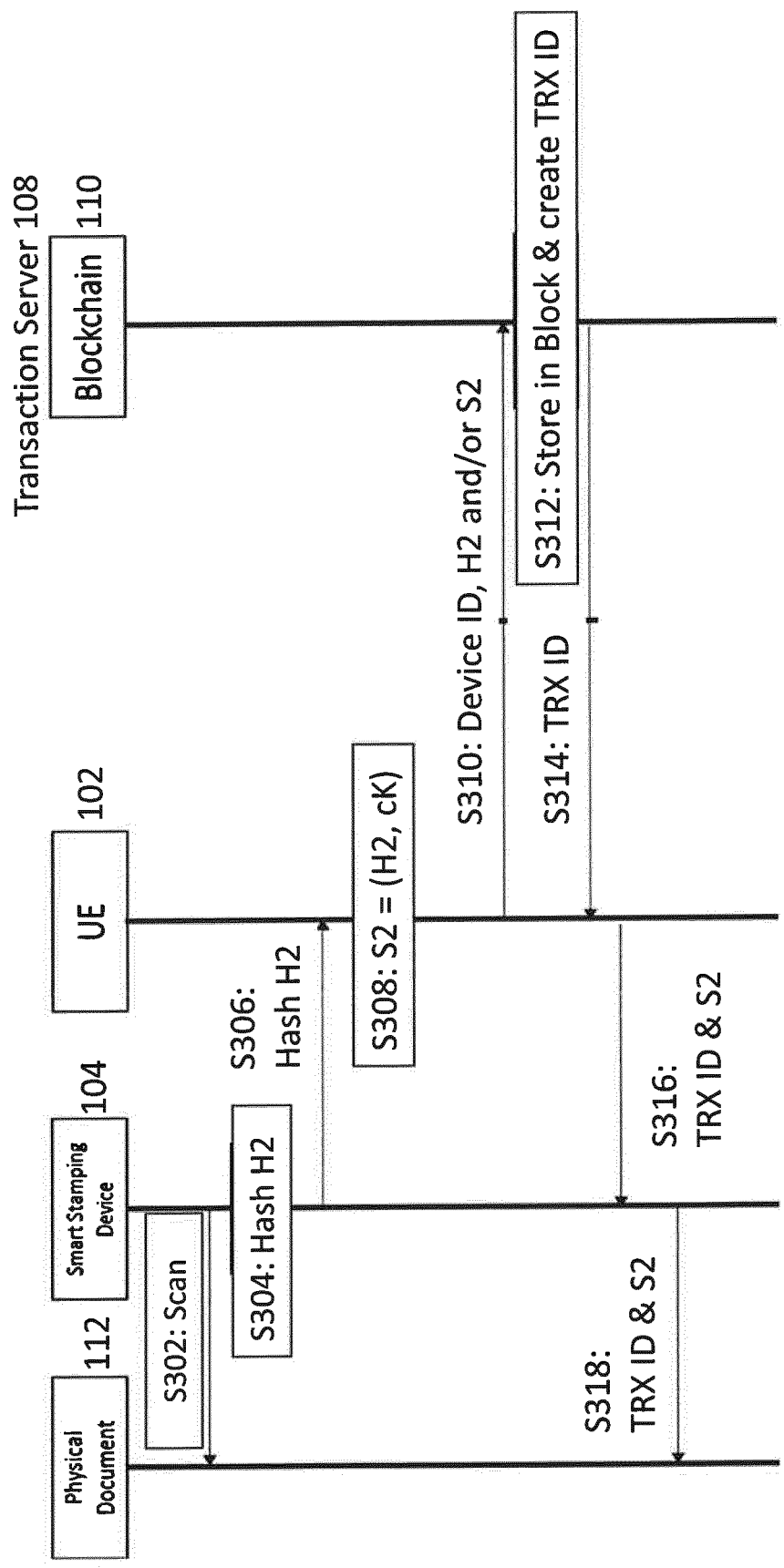
FIG. 3 is a signaling diagram illustrating a first protection method embodiment of the present disclosure.

In the scenario of FIG. 3, the EPDR is the hash H2. In other scenarios, the hashing step S304 may be omitted. In such a case, the electronic file generated by the scanning step S302 or the electronic file 114 of the document to be protected may constitute the EPDR.

In step S306, the SSD 104 transfers the hash H2 via a wired or wireless point-to-point connection to the user device 102. The user device 102 then, in step S308, applies its cryptographic key cK to the hash H2 to obtain a cryptographically processed document representation (i.e., a CPDR) in the form of a signed hash S2 as follows:

$$S2=(H2,cK).$$

In a further step S310, the user device 102 transmits its device identifier Device ID together with a verification parameter comprising at least one of the hash H2 and the signed hash S2 towards the transaction server 108. Upon receipt of the device identifier Device ID and verification parameter(s), the transaction server 108 generates a transaction identifier TRX ID that is to be associated with the ongoing document protection transaction. The transaction server 108 is configured to log, in step S312, the device identifier Device ID, the verification parameter(s) H2/S2 as well as the transaction identifier TRX ID in a tamper-proof manner in a block of the blockchain within the database 110.

In step S314, the transaction server 108 returns the transaction identifier TRX ID to the user device 102. The user device 102 then triggers, in step S316, the printing module 104B of the SSD 104 to print of transaction identifier TRX ID and the signed hash S2 on the physical document 112 so as to obtain a cryptographically protected physical document 116 (step S318, see also FIG. 1). Alternatively, if the whole process is based on the electronic file representation 114 of the document to be protected, the whole document 116 with the transaction identifier TRX ID and the signed hash S2 thereon may be generated in a single printing step. In this manner, cryptographic document protection is achieved by the resulting association between the transaction identifier TRX ID and the signed hash S2 on the physical document 116 on the one hand and the information logged for this transaction by the transaction server 108 on the other hand.

The transaction information sent to the transaction server 108 in step S310 may comprise one or more additional items of information that could also be logged in the blockchain in association with the transaction identifier. Such additional items of information may comprise location information indicative of the location where the user device 102 has applied the cryptographic key cK (e.g., in the form of coordinates of a satellite navigation system such as Galileo), a time stamp indicative of the point in time when the user device 102 has applied the cryptographic key cK, the device identifier in the specific form of an IMPI of the user device 102, and at least one cryptographic parameter used by the user device 102 for calculation of the cryptographic key cK.

These additional items of information may be used for various purposes, including locating individual transactions stored on the transaction server 108 based on criteria such as time or date, geographical location, and so on. Moreover, the location information may be used to verify the location where the document protection transaction was triggered.

The cryptographic key cK used for signing the hash H2 may be obtained in various ways. As an example, the cryptographic key cK may be a private key pK of the user device 102 that is calculated together with an associated public key. In this case, the signed hash S2 may be calculated as follows:

$$S2=(H2,pK).$$

The asymmetric cryptographic key set comprising the private key pK and its associated public key may be obtained from a KPI portal within the communication network 106. As an example, the public and private keys can be based on an extension of the GBA system as defined by 3GPP. In this extension, a NAF is acting as PKI in accordance with 3GPP TS 33.221 (e.g., V15.0.0 (2018-06)). The GBA is standardized in 3GPP standard TS 33.220 (e.g., V15.3.0 (2018-09)) and related 3GPP, IETF and other standards, directly or indirectly referenced by TS 33.220. One such standard is 3GPP TR 33.919 (e.g., V15.0.0 (2018-06)). It outlines the relations of the various GBA and other standards, and GBA's place in the 3GPP generic authentication architecture (GM).

Alternatively, instead of using an asymmetric cryptographic key set, the cryptographic key cK may be a common secret key shared between the user device 102 and an entity within the communication network 106. As an example, the common secret key may belong to symmetric cryptography keys KsNAF generated using GBA procedures, so that $$S2=(H2,KsNAF).$$

Figure 4:
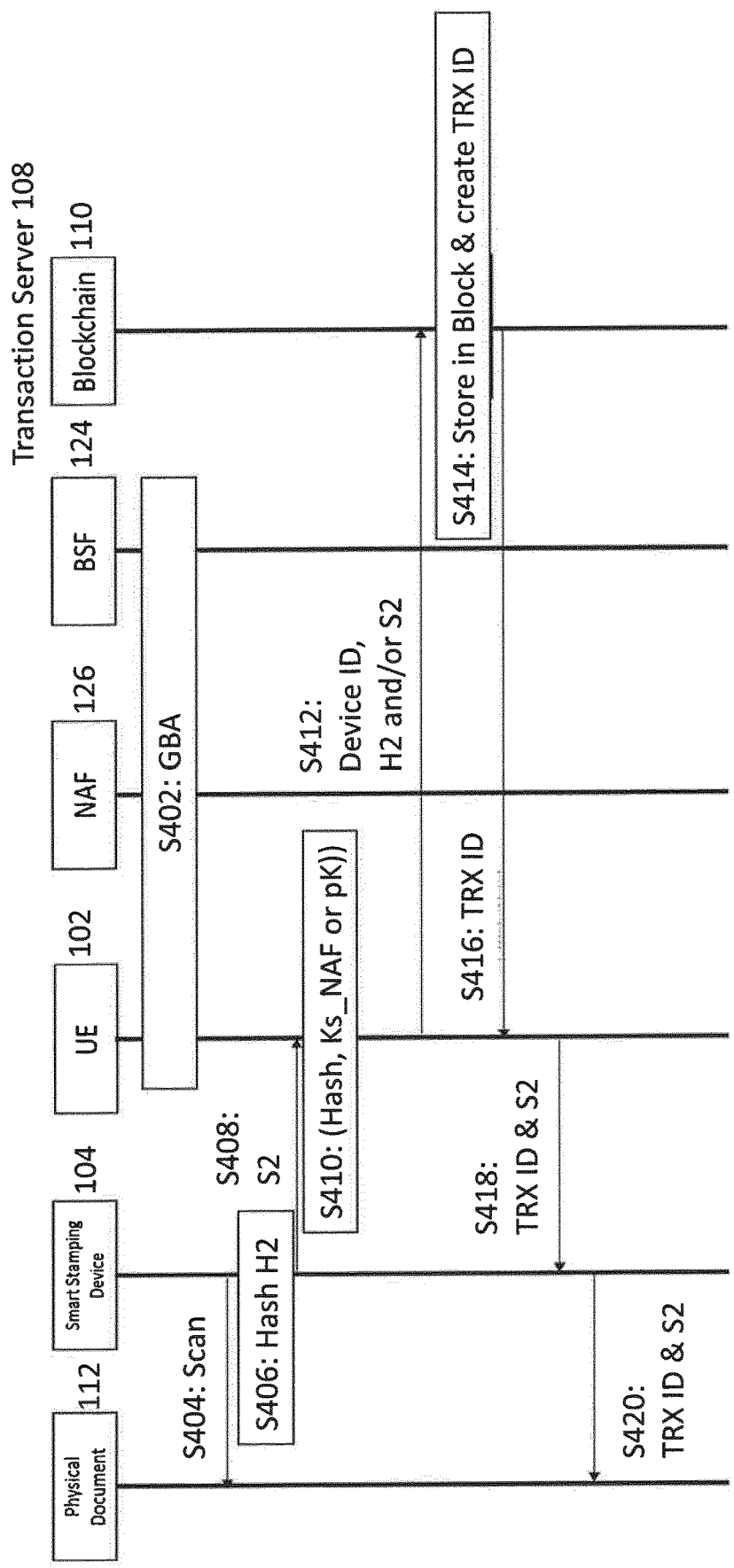
FIG. 4 is a signaling diagram illustrating a second protection method embodiment of the present disclosure.

FIG. 4 illustrates in a signaling diagram 400 that is based on the signaling diagram 300 of FIG. 3 an initial step S402 in which the user device 102 and two GBA components 124, 126 cooperate to derive the asymmetric cryptographic key set comprising the private key pK and its associated public key or the symmetric cryptographic key set comprising KsNAF. The remaining steps S404 to S420 then substantially correspond to steps S302 to S318, respectively.

Figure 5:
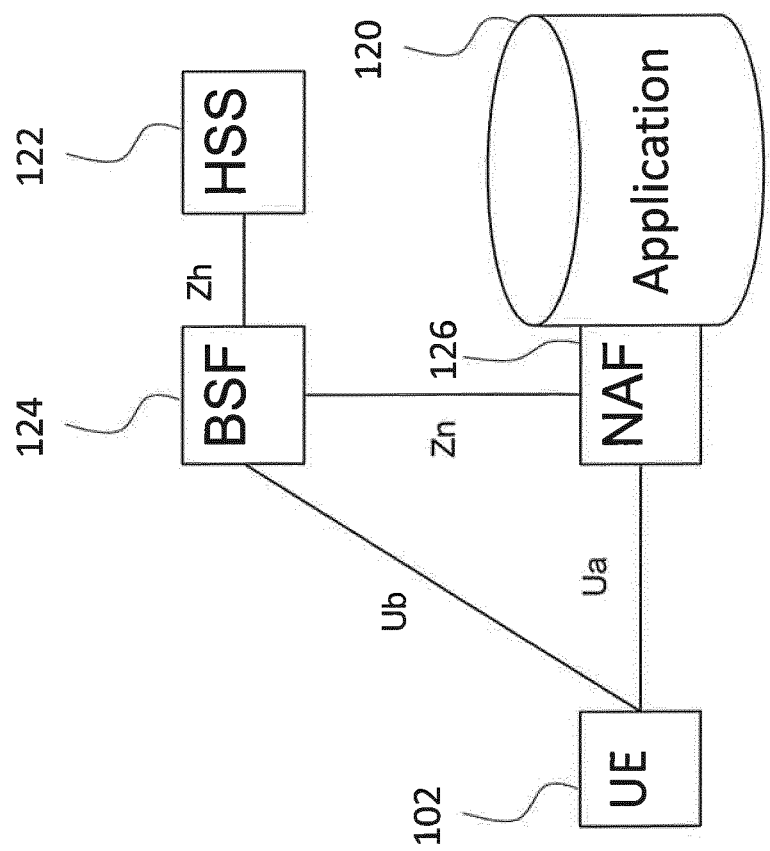
FIGS. 5-7 schematically illustrate aspects of a general bootstrapping algorithm and of key derivation functions as used in exemplary embodiments of the present disclosure.

FIG. 5 shows the basic GBA components. The GBA core function is to dynamically establish a shared secret between a user device, denoted as UE, 102 and a service provided, for example, by an application 120. The GBA uses mobile network subscriber data—which an MNO keeps in its mobile network—to perform the function of dynamically establishing a shared secret. The subscriber data may, for example, be stored on na HSS 122 operated by the MNO. The service that is to be provided need not necessarily be under the control of the MNO. In fact, the ability to use mobile network subscriber data to establish a shared secret with a 3rd party service, without having to provide the 3rd party with the confidential mobile network subscriber data from the MNO, is a GBA key feature.

Once such a shared secret is established it can be used for a variety of purposes. A common usage is to authenticate a mobile network user, and the GBA core standard TS 33.220 specifies the GBA in the context of user authentication. Another usage is to use it for cryptography certificate distribution, as described in TS 33.221 and as usable also in the context of the asymmetric cryptographic key set comprising the private key pK and its associated public key.

The GBA is operated roughly as it follows (see again FIG. 5). Initially, a BSF 124 is provided, typically under the control of the MNO. The BSF 124 is connected to the HSS 122 of the NMO using a standardized reference point Zh. As explained above, the HSS 122 stores mobile network subscriber identity information as well as other data relevant for GBA and data for HSS functions not relevant for GBA. The HSS 122 is a central component in any 3GPP network when it comes to manage subscribers, their identity, access rights, security parameters, and so on. It is therefore well protected in any mobile network. The BSF 124, sitting in front of the HSS 122, protects the HSS 122 from direct access by the mentioned 3rd party, and only provides information necessary for GBA purposes.

Two network elements make use of the BSF 124. One is the user device 102, via reference point Ua. The user device 102, in turn, contains the security module 102D (see FIG. 2B) such as a SIM card or eSIM. The security module 102D contains identity and security information which correspond to those stored in the HSS 122 for the user.

The second entity in GBA that makes use of the BSF 124 is a NAF 126, via reference Point Zn. The NAF 126 verifies the authentication of messages. Those messages are application messages, and the NAF 126 typically provides the message authentication on behalf of a specific service application 120. This means that the NAF 126 acts as a kind of gatekeeper, typically only allowing those messages received via Ua it could verify to reach the service application 120. Although the GBA is not strictly limited to it, messages on Ua are typically using the hypertext transfer protocol (HTTP) and related web technologies like HTTP digest authentication, see 3GPP TS 24.109 (e.g., V15.0.0 (2018-06)). The NAF 126 and the service application 120 are under the control of a service provider (i.e., typically a 3rd party, which need not be the MNO).

A regular GBA implementation uses two interleaved HTTP digest authentication challenge-response procedures to bootstrap a shared secret between a client and a server. 3GPP TS 24.109 describes in more detail how these challenge-response procedures are performed, using HTTP digest authentication.

Figure 6:
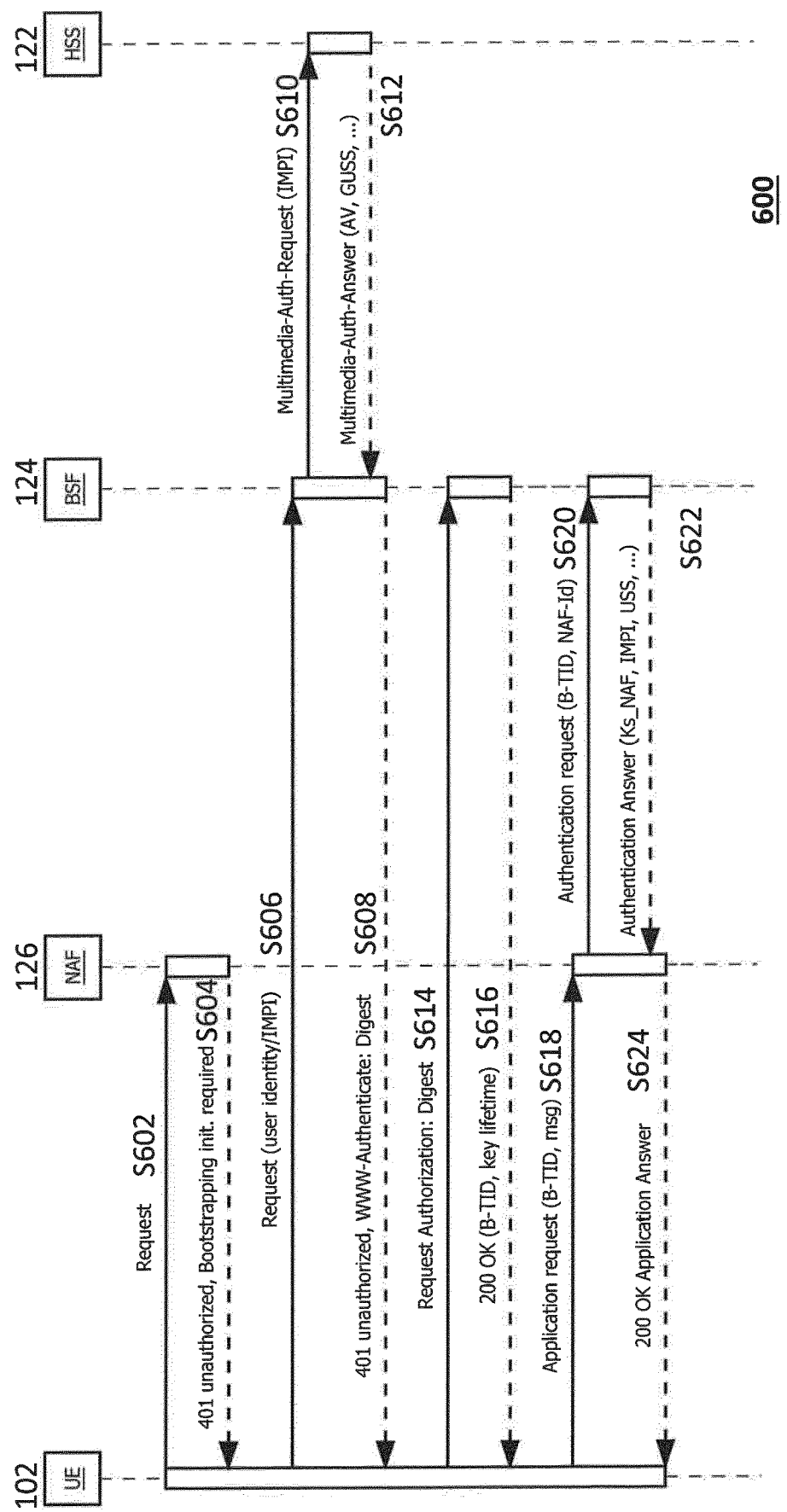
Figure 7:
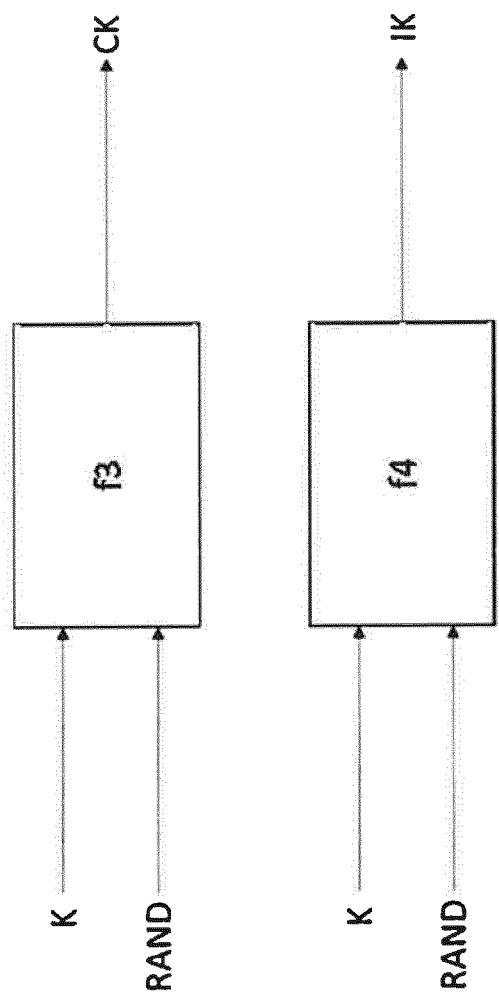

GBA shared secret establishment and authentication may be performed in the context of the present disclosure as depicted in the signalling diagram 600 of FIG. 6. Basically, the user device 102 attempts to access the service application 120 via the NAF 126. The NAF 126 indicates to the user device 102 that a GBA procedure is required by rejecting the message, providing certain rejection and authentication challenge data as part of the rejection, using HTTP digest authentication (see steps S602 and S604). The user device 102, upon receiving that information, or proactively, performs a bootstrapping procedure with the BSF 124 and informs same about its IMPI (see steps S606 and S608). The BSF 124, in turn, requests and receives an Authentication Vector (AV) based on this IMPI from the HSS 122 (see steps S610 and S612).

In the context of further signaling steps S614 to S624, a shared secret in the form of a common secret key KsNAF is independently calculated by the user device 102 and the BSF 124 as follows:

$$KsNAF = KDF(Ks, \text{``gba-me''}, RAND, IMPI, NAF\_Id)$$

Here, Ks is the secret key which never leaves the security module 102C at the side of the user device 102 and never leaves the BSF 124 at the network (NMO) side. Ks is a concatenation of two keys CK and IK derived by specified functions f3 and f4 respectively (see FIG. 7) on the basis of Ks and a random challenge RAND. CK and IK are the parameters of the AV obtained by the BSF 124 from the HSS 122 during the bootstrapping procedure (see steps S610 and S612). Other input parameters to the key derivation function (KDF) include the IMPI, a identifier of the NAF 126 (NAF_ID) and cryptographic parameters "gba-me" (a parameter indicating that GBA_ME is used) and RAND (the random challenge also used to calculate CK and IK), as defined in TS 33.220.

The user device 102 and the BSF 124 keep track of RAND, NAF_ID, IMPI and "gba-me" used to calculate KsNAF. According to TS 32.220, on expiration of a key lifetime (as communicated in step S616 to the user device 102), the user device 102 shall delete all GBA keys related to a certain Ks (i.e., Ks itself, and NAF-specific keys derived from this specific Ks) and the corresponding NAF_IDs, B-TID (a bootstrapping transaction identifier), and so on.

Having thus explained the operation of the network system 100, and in particular of the user device 102, in the context of creating the protected physical document 116, the aspect of document verification will now be described with reference to the lower part of FIG. 1 and FIGS. 8 to 15. It will be assumed that the user device 102 in the lower part of FIG. 1 is confronted with the task of verifying authenticity and integrity of a physical document 118 on which a transaction identifier TRX ID and a CPDR S1 have been printed. In regard to document integrity, it needs to be verified if the content of the physical document 118 is identical to the content of the cryptographically protected document 116 (or if the content of the physical document 118 has been manipulated). In regard to document authenticity, it needs to be verified if the CPDR S1 as printed on the document 118 is signed by UE 102 (only).

The user device 102 performing the verification procedure as illustrated in the lower part of FIG. 1 may be identical to the user device 102 that has performed the cryptographic document protection procedure as illustrated in the upper part of FIG. 1. However, as a rule, the two user devices 102 in FIG. 1 will be different devices operated by different users.

Initially, as shown in the lower part of FIG. 1, the user device 102 will trigger the scanning module 104A of SSD 104 to scan the physical document 118 that is to be verified. As a result, the user device 102 will obtain the transaction identifier TRX ID and the CPDR S1. It will be appreciated that OCR and, optionally, other operations may be performed by either the user device 102 or the SSD 104 to derive the transaction identifier TRX ID and the CPDR S1 from the scan.

The user device 102 also derives an EPDR H3 from the scan. This EPDR H3 is based on the content of the physical document 118 to be verified, from which the transaction identifier and the CPDR S1 as printed on the physical document 118 may have been removed. In more detail, the user device 102 applies the same hash function that has previously been used upon document protection (see steps S304 and S406) to the scanned content of the physical document 118 to obtain the EPDR (hash) H3.

As also shown in FIG. 1, the user device 102 sends the transaction identifier TRX ID derived from the physical document 118 via the communication network 106 to the transaction server 108 and receives, from the transaction server 108, the previously logged transaction information associated with the transaction identifier TRX ID. The received transaction information comprises a logged device identifier Device ID) associated with the underlying document protection transaction and further logged parameters such as one or both of the hash H2 and the signed hash S2.

In the network system 100, multiple verification parameter sets can be defined. A first verification parameter set comprises at least the CPDR S1 and an EPDR HS1. The EPDR HS1 is obtained by applying a cryptographic key (such as a public key of the user device 102 depicted in the upper portion of FIG. 1 or KsNAF) associated with the device identifier Device ID to the CPDR S1.

A second verification parameter set comprises at least one of the EPDR H3 and a CPDR SH1. The CPDR SH1 is obtained by applying a cryptographic key (such as a public key of the user device 102 depicted in the upper portion of FIG. 1 or KsNAF) associated with the device identifier Device ID to the EPDR H3.

Furthermore, a third verification parameter set comprises at least one of the EPDR (i.e., the hash) H2 printed on the original physical document 116 that was to be protected and the CPDR (i.e., the signed hash) S2 derived by applying a cryptographic key (such as such as a public key of the user device 102 depicted in the upper portion of FIG. 1 or KsNAF) associated with the device identifier Device ID to the EPDR M2. As explained above, the third parameter set is received with the transaction information.

Figure 8:
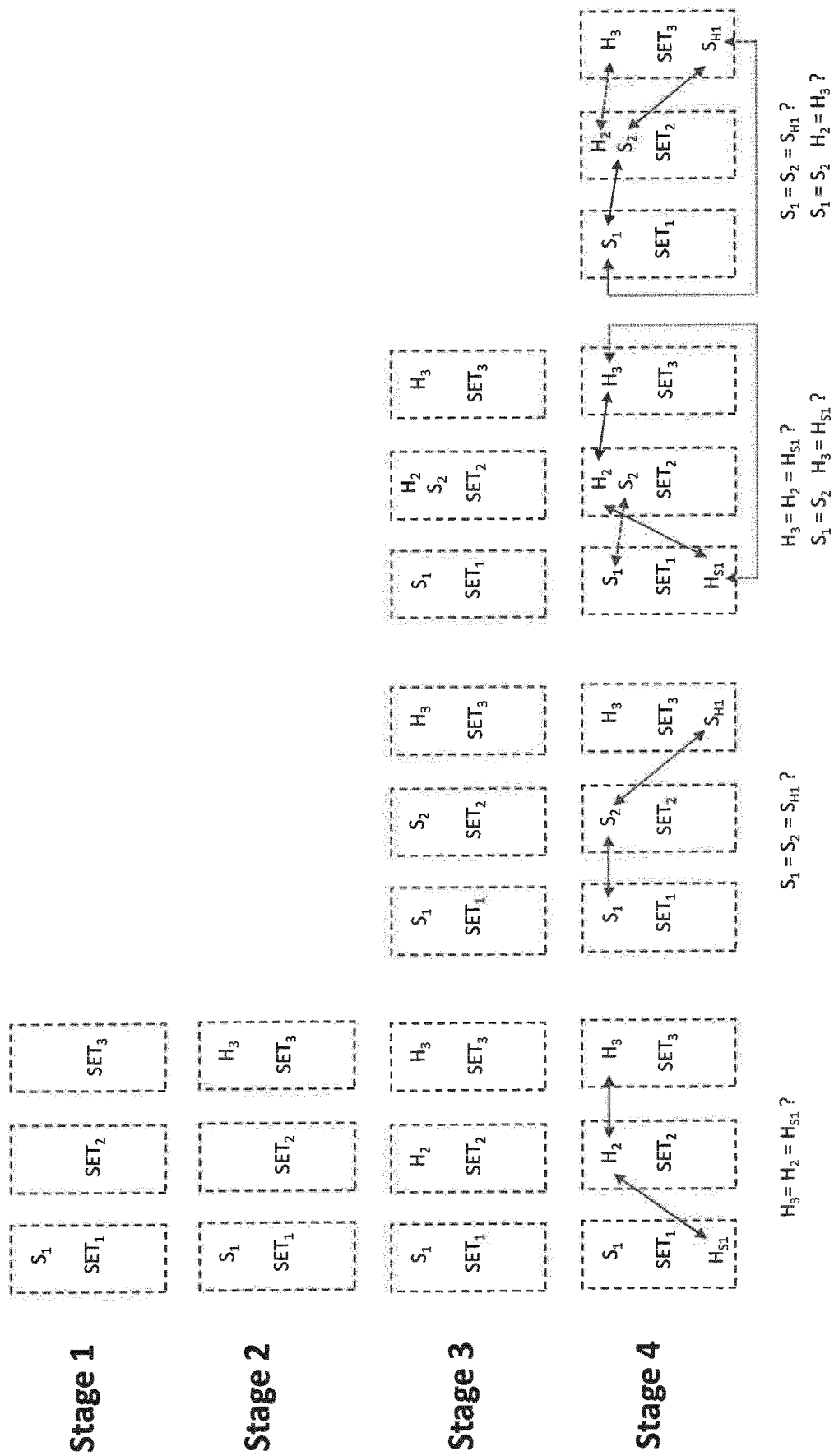
FIGS. 8-10 schematically illustrated parameter set correspondence aspects usable in verification method embodiments of the present disclosure.

FIG. 8 schematically illustrates various stages of populating the three verification parameter sets $SET_i$ (i=1, 2, 3) by the user device 102 upon verifying the physical document 118. Each parameter set $SET_i$ will be populated with at least one verification parameter.

The first parameter set $SET_1$ is populated with the CPDR S1 as extracted from the scan of physical document 118 (stage 1). The third parameter set $SET_3$ is populated with the hash H3 derived by applying the hash function to the content of the physical document 118 as also derived from the scan (stage 2). In stage 3, the second parameter set $SET_2$ is populated with one or both of the signed hash S2 and the hash H2 as received from the transaction server 108 in response to transmission of the transaction identifier TRX ID. It should be noted that stages 1, 2 and 3 can be performed in any order. In some variants, the parameter sets may in stage 4 further be populated with the CPDR SH1 ($SET_1$) and the EPDR HS1 ($SET_3$) as explained above and in greater detail below.

Once the three parameter sets $SET_i$ have each been populated with at least one verification parameter, the user device 102 triggers verification of the physical document 118 based on a parameter correspondence between the three parameter sets $SET_i$. The user device 102 may check the parameter correspondence itself or trigger another device such as the BSF 124 (e.g., via the NAF 126) to check the parameter correspondence and to return the verification result to the user device 102.

Exemplary variants for checking the parameter correspondence are illustrated in stage 4 in FIG. 8. The parameter correspondence may be checked pairwise and in regard to the same parameter type. A first parameter type is "CPDR" (such as a signed hash over document content) and a second parameter type is "EPDR" (such as a hash over document content or the document content as such).

Generally, a positive parameter correspondence between any two parameters of the same parameter type means that those two parameters have identical (e.g., numerical) values. Such a positive parameter correspondence has to be found for two different pairs of the three parameter sets $SET_i$. As illustrated in FIG. 8 (see stage 4), a positive parameter correspondence is found if H3=H2=HS1 or if S1=S2=SH1. Of course, a positive parameter correspondence may stretch over different parameter types as long as all three parameter sets are involved (see again FIG. 8: S1=S2 and H3=HS1, or S1=S2 and H2=H3, and so on).

Figure 9:
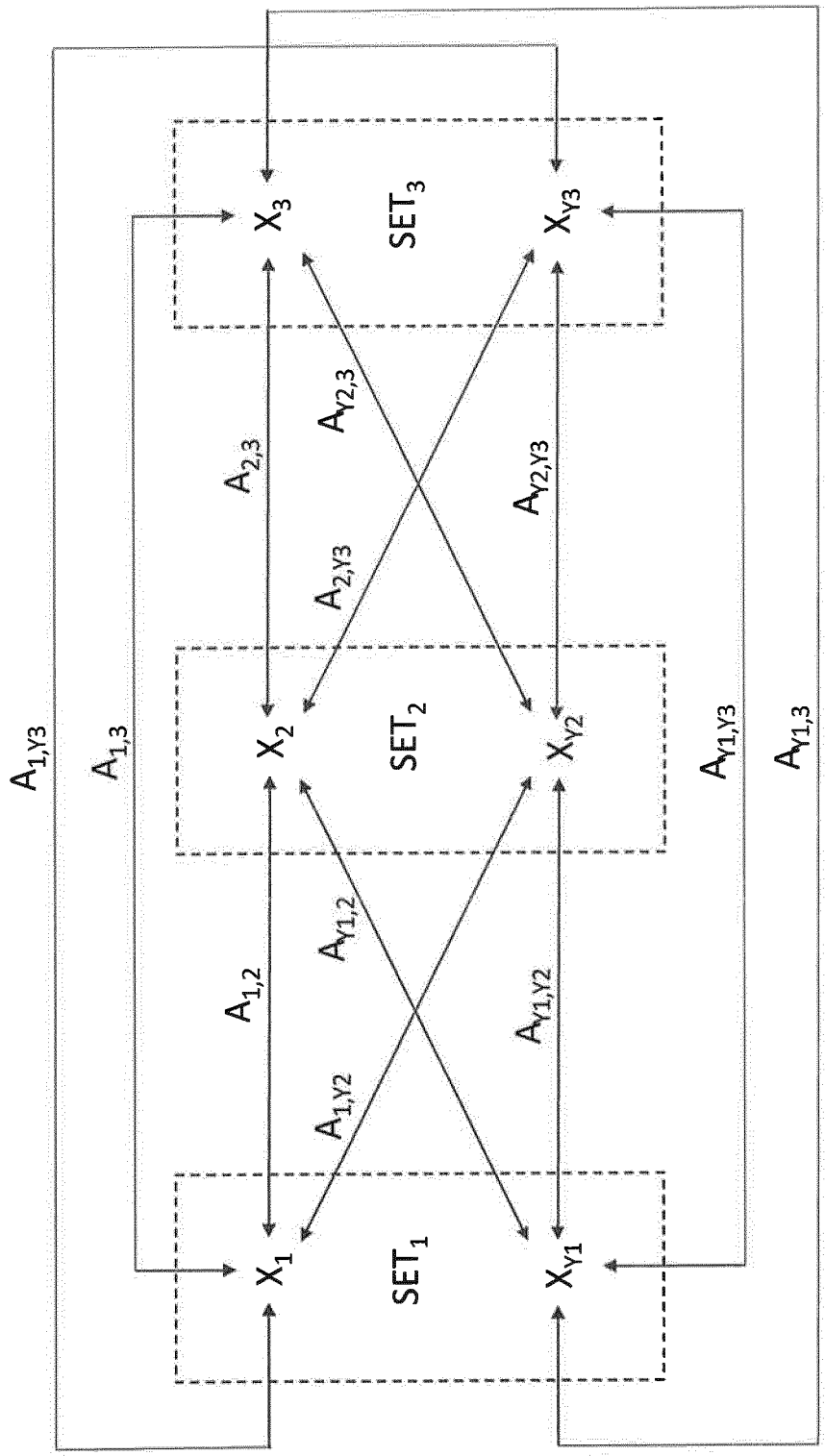
Figure 10A:
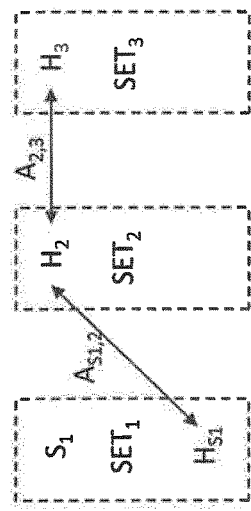
Figure 10B:
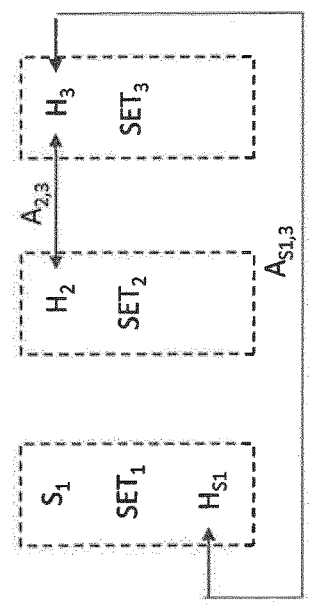

Generally, the possible correspondences, or relations, between any two parameters of any two parameter sets may be denoted by the letter A, as generally illustrated in FIG. 9. Given the specific notations utilized in FIG. 8, two concrete examples for the testing parameter correspondences are illustrated in FIGS. 10A and 10B. With reference to FIG. 10A, the verification of the physical document 118 based on a parameter correspondence between the first parameter set $SET_1$, the second parameter set $SET_2$ and the third parameter set $SET_3$ may include checking a first parameter correspondence $A_{S1,2}$ between HS1 and H2 for parameter sets $SET_1$ and $SET_2$ and a second parameter correspondence $A_{2,3}$ between H2 and H3 for parameter sets $SET_2$ and $SET_3$. As a further example illustrated in FIG. 10B, the verification of the physical document 118 based on a parameter correspondence between the first parameter set $SET_1$, the second parameter set $SET_2$ and the third parameter set $SET_3$ may include checking a first parameter correspondence $A_{S1,3}$ between HS1 and H3 for parameter sets $SET_1$ and $SET_3$ and a second parameter correspondence $A_{2,3}$ between H2 and H3 for parameter sets $SET_2$ and $SET_3$. Of course, based on the general illustration of FIG. 9, further examples for a pairwise testing of parameter correspondences can be derived.

Figure 11:
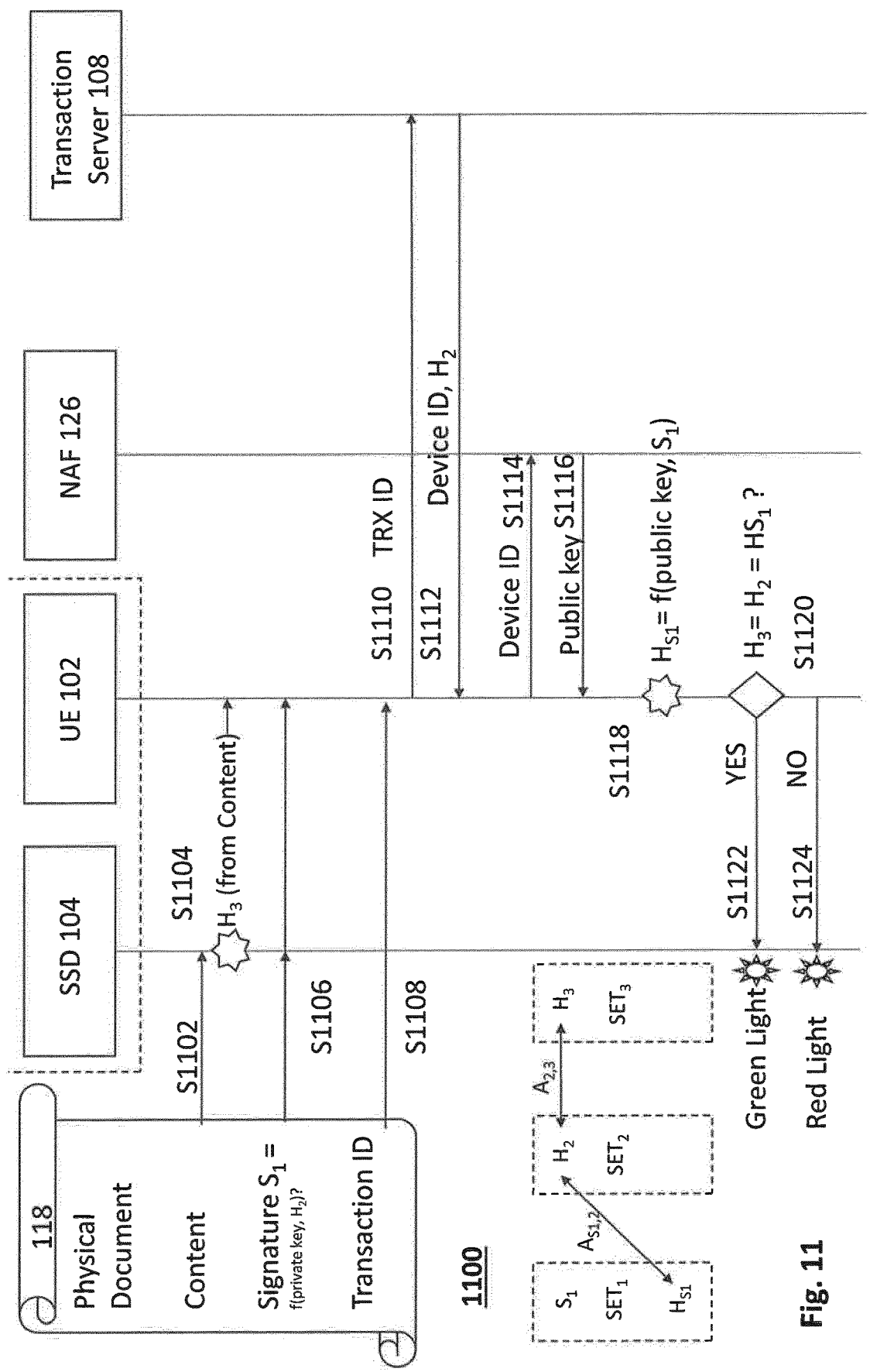
FIGS. 11-15 are signaling diagrams illustrating a various document verification method embodiments of the present disclosure.

Now, with reference to the signaling diagrams of FIGS. 11 to 15, various more detailed document verification embodiments of the present disclosure will be discussed. The signaling diagram of FIG. 11 shows a verification approach that is based on an asymmetric cryptographic key set comprising the private key pK and its associated public key obtained from a GBA-based KPI portal, as described above, or obtained in any other manner. The signaling diagrams of FIGS. 12 to 15, on the other hand, show different verification approaches based on symmetric cryptography keys KsNAF derived using the GBA, as also described above, or obtained otherwise.

Referring to the signaling diagram 1100 of FIG. 11 for asymmetric cryptography, verification of the physical document 118 starts in step S1102 with scanning the content of the physical document 118 to be verified using the scanning module 104A of the SSD 104. Step S1102 may have been triggered by the user device 102 via a point-to-point connection between the SSD 104 and a processing unit (see reference numeral 102A in FIGS. 2A and 2B) of the user device 102. As explained above, the SSD 104 may in some variants be integrated into the user device 102. In other variants, the SSD 104 may be pluggable into the user device 102, or vice versa.

Then, in step S1104, the SSD 104 applies a hash function to the scanned content so as to derive the EPDR (i.e., hash) H3 and forwards the hash H3 to the user device 102. As explained above, the same hash function as applied in the context of document protection will be used in step S1104. Prior to application of the hash function, the scanned file with the document content may be subjected to OCR processing. The hash function (and, optionally, OCR processing) may alternatively be applied by user device 102 using the cryptographic hash generator 102C (see FIGS. 2A and 2B). In such a case, the SSD 104 forwards the scanned document content to the user device 102 before the user device 102 applies the hash function.

In two further steps S1106 and S1108, the CPDR (i.e., the signed hash) S1 and the transaction identifier TRX ID are scanned by the scanning module of the SSD 104 and forwarded, optionally after OCR processing, to the user device 102. In another embodiment, OCR processing will be applied by the user device 102. It will be appreciated that in still further embodiments, the document content, the signed hash S1 and the transaction identifier may be scanned in a single scanning operation. Using image processing and OCR techniques, the three informational items (i.e., document content, signed hash S1 and transaction identifier) are then separated from each other and processed further.

In step S1110, the user device 102 forwards the transaction identifier TRX ID via the communication network 106 (see FIG. 1) to the transaction server 108. The transaction server 108 looks up the data block in the blockchain that contains the transaction identifier TRX ID received in step S1110 and further transaction information associated with this transaction identifier TRX ID (as also stored in the blockchain). In the present embodiment, this further transaction information consists of the device identifier Device ID of the user device 102 that triggered the document protection transaction and of the EPDR (i.e., hash) H2 of the content of the protected physical document 116 (see also FIG. 1). The further transaction information is returned to the user device 102 in step S1112.

In step S1114, the user device 102 forwards the device identifier Device ID received from the transaction server 108 in step S1114 to the NAF 126. The NAF 126 looks up the public key locally stored in association with this device identifier Device ID and returns the public key to the user device 102 in step S1116. As an example, the device identifier Device ID may be an IMPI of the user device 102 illustrated in the upper portion of FIG. 1, and the public key may be derived by the NAF from a subscriber certificate associated with this IMPI.

Then, in step S1118, the user device 102 applies the public key received from the NAF 126 in step S1116 to the signed hash S1 (as received from the SSD 104 in step S1106) to retrieve the EPDR (i.e., hash) HS1 that is supposed to correspond to the EPDR (i.e., hash) H2 of the content of the original physical document 116. In more detail, the user device 102 checks in step S1120 a first parameter correspondence AS1,2 between HS1 and H2 for parameter sets $SET_1$ and $SET_2$ and second parameter correspondence A2,3 between H2 and H3 for parameter sets $SET_2$ and $SET_3$, as also illustrated in FIG. 11 and previously discussed with reference to FIG. 10A.

In case the first parameter correspondence and the second parameter correspondence can positively be verified (i.e., HS1=H2 and H2=H3) by the user device 102 in step S1120, the user device 102 sends a confirmation signal to the SSD 104 in step S1122. The confirmation signal may trigger the SSD 104 to output information (i.e., a green light) confirming document verification to a user. Alternatively, in case at least one of the first parameter correspondence and the second parameter correspondence cannot positively be verified (i.e., HS1≠H2 and/or H2≠H3) by the user device 102 in step S1120, the user device 102 sends a warning signal to the SSD 104 in step S1124. The warning signal may trigger the SSD 104 to output information (i.e., a red light) informing a user that document verification has failed. Of course, such information could alternatively be output by the user device 102 itself or communicated in any other manner.

Figure 12:
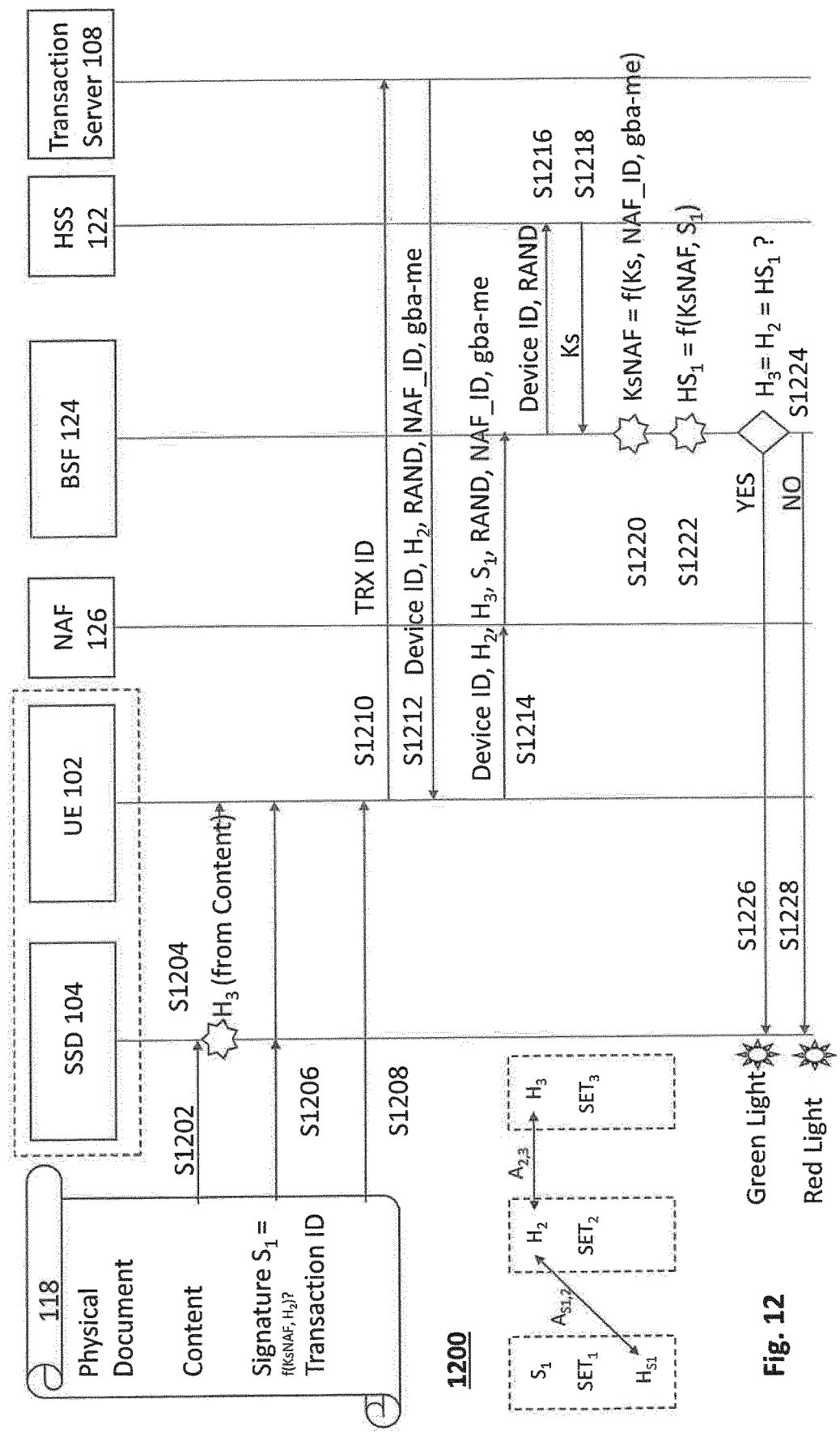
Figure 13:
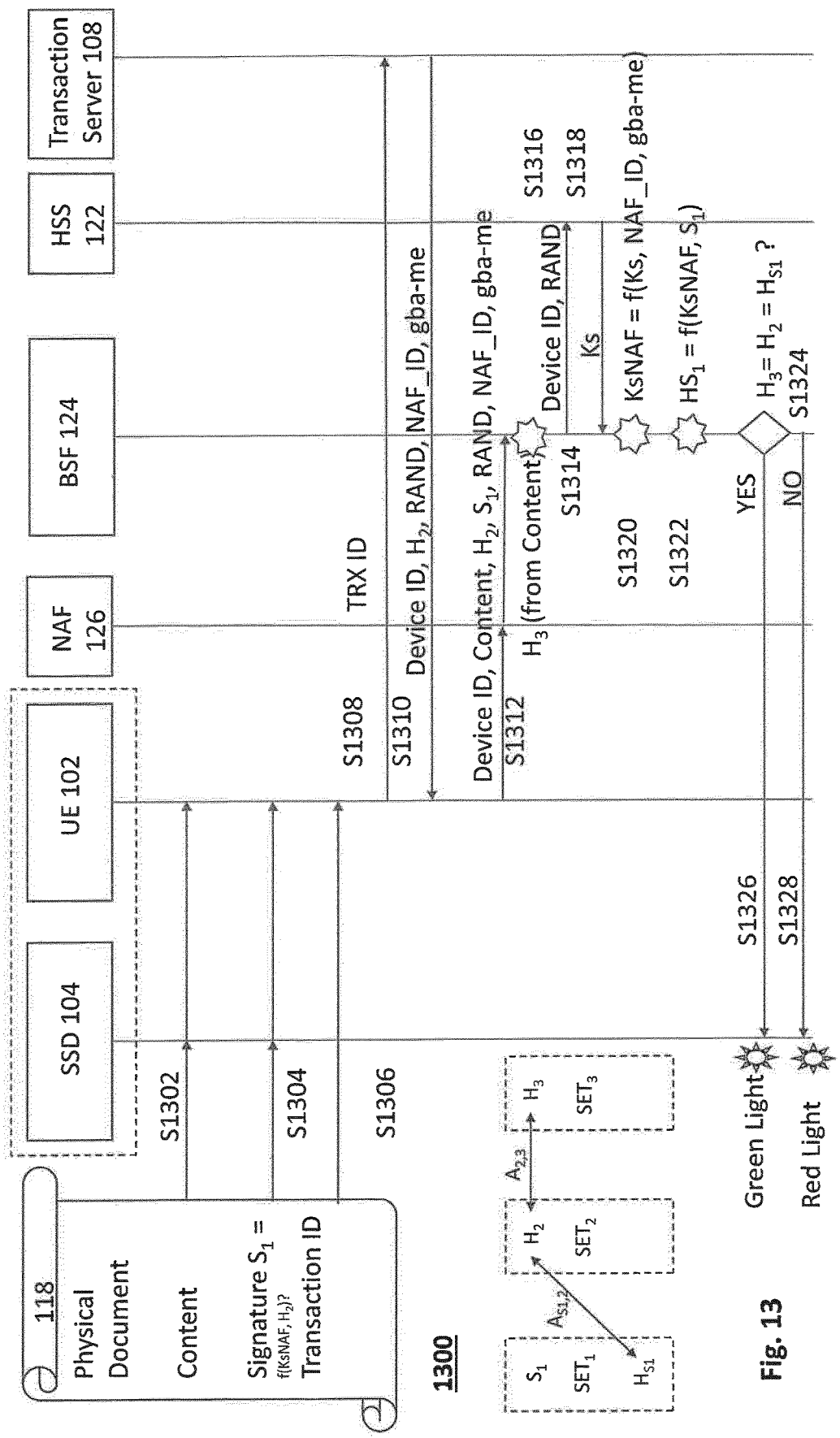

Now turning to the signaling diagram 1200 of FIG. 12 for symmetric cryptography, verification of the physical document 118 starts in step S1202 with scanning the content of the physical document 118 to be verified using the scanning module 104A of the SSD 104. Step S1202 and the further steps S1204 to S1210 correspond to steps S1102 to S1110, respectively, as discussed above in the context of FIG. 11.

Deviating from the asymmetric cryptography embodiment illustrated in FIG. 11, in the symmetric cryptography embodiment of FIG. 12 the transaction information stored in the blockchain and returned by the transaction server 108 in step S1212 not only comprises the device identifier Device ID and the hash H2, but additionally three further parameters RAND, gba-me and NAF_ID. These parameters have been provided to the transaction server 108 in the context of the document protection transaction illustrated in FIG. 4 (namely in step S412) and have initially been acquired in the initial GBA procedure (namely in step S402).

In step S1214, the user device 102 forwards the device identifier Device ID, the parameters RAND, gba-me and NAF_ID and the hash H2 as received from the transaction server 108 in step S1214 together with the signed hash S1 and the hash H3 as derived from the physical document 118 to be verified to the BSF 124. The BSF 126 forwards the device identifier Device ID and the random challenge RAND received in step S1214 from the user device 102 to the HSS 122 in step S1216. The HSS 122 then derives the secret key Ks used in the initial GBA procedure (see step S402 in FIG. 4) based on the device identifier Device ID and the random challenge RAND received in step S1216 and returns the secret key Ks to the BSF 124 in step S1218.

In step S1220, the BSF 124 generates the common secret key KsNAF from the secret key Ks (as received in step S1218 from the HSS 122) and from the parameters NAF_ID and gba-me (as received in step S1214 from the user device 102). In a further step S1222, the BSF 124 applies the common secret key KsNAF to the signed hash S1 as retrieved from the physical document 118 to be verified to recover or obtain the hash HS1 that is supposed to correspond to the hash H2 of the content of the original physical document 116. In more detail, the BSF 124 checks in step S1224 a first parameter correspondence AS1,2 between HS1 and H2 for parameter sets $SET_1$ and $SET_2$ and second parameter correspondence A2,3 between H2 and H3 for parameter sets $SET_2$ and $SET_3$, as also illustrated in FIG. 12 and previously discussed with reference to FIG. 10A.

In case the first parameter correspondence and the second parameter correspondence can positively be verified (i.e., HS1=H2 and H2=H3) by the BSF 124 in step S1224, the BSF 124, via the user device 102, sends a confirmation signal to the SSD 104 in step S1226. The confirmation signal may trigger the SSD 104 to output information (i.e., a green light) confirming document verification to a user. Alternatively, in case at least one of the first parameter correspondence and the second parameter correspondence cannot positively be verified (i.e., HS1≠H2 and/or H2≠H3) by the BSF 124 in step S1120, the BSF 124 sends a warning signal via the user device 102 to the SSD 104 in step S1228. The warning signal may trigger the SSD 104 to output information (i.e., a red light) informing a user that document verification has failed. Of course, such information could alternatively be output by the user device 102 itself or communicated in any other manner.

Figure 14:
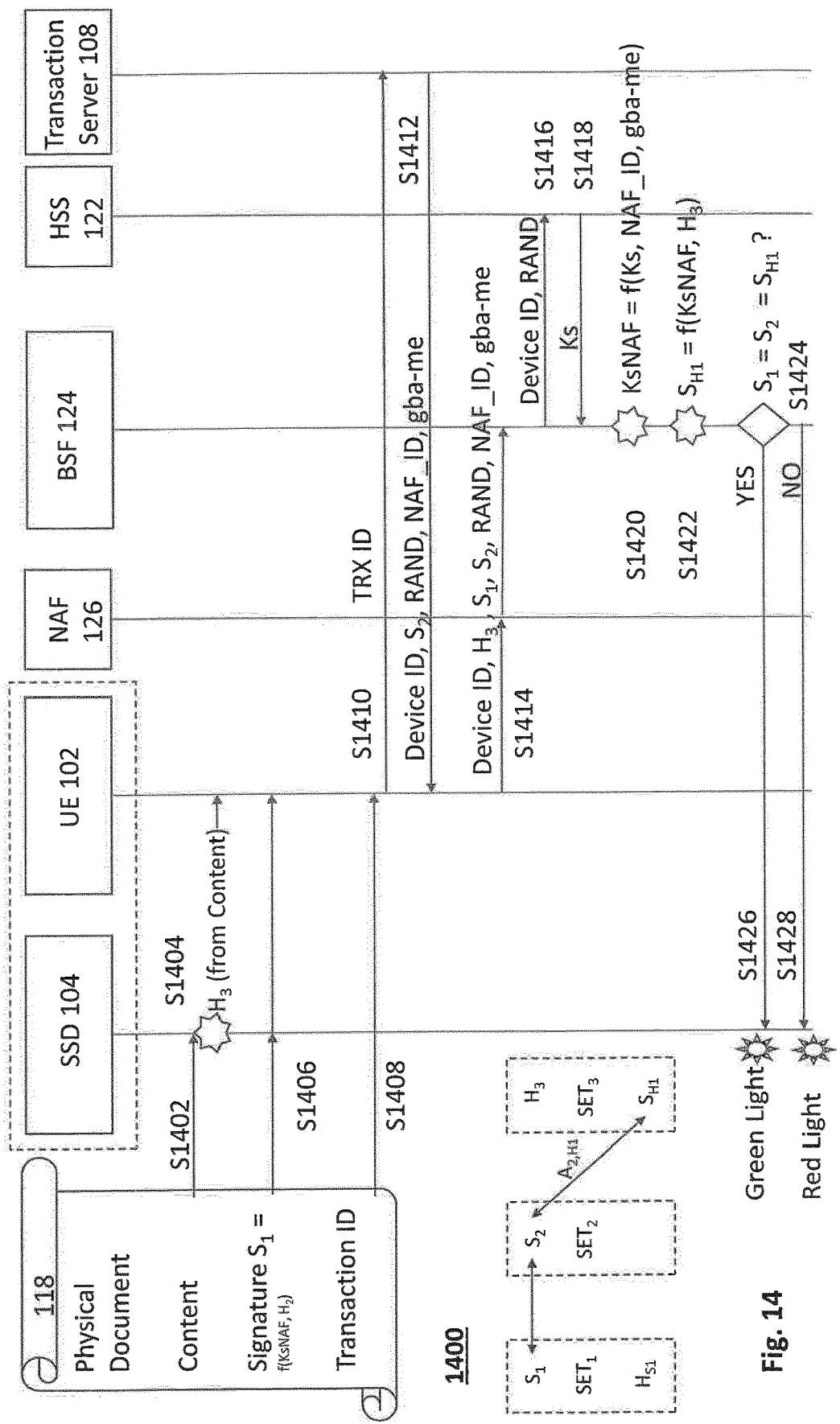

Now turning to the signaling diagram 1400 of FIG. 14 for symmetric cryptography, steps S1402 to S1428 substantially correspond to steps S1202 to S1228, respectively, as discussed above in the context of FIG. 12 with the exception that the transaction server 108 returns the signed hash S2 instead of the hash H2 in step 1412 and in that in step S1414 this signed hash S2 is then forwarded to the BSF 124. Moreover, in step S1422, the BSF 124 applies KsNAF to the hash H3 so as to obtain the signed hash SH1. As such, the BSF 124 will check in step S1424 a first parameter correspondence $A_{1,2}$ between S1 and S2 for parameter sets $SET_1$ and $SET_2$ and second parameter correspondence $A_{2,H1}$ between S2 and SH1 for parameter sets $SET_2$ and $SET_3$, as also illustrated in FIG. 14.

In case the first parameter correspondence and the second parameter correspondence can positively be verified (i.e., S1=S2 and S2=SH1) by the BSF 124 in step S1424, the BSF 124, via the user device 102, sends a confirmation signal to the SSD 104 in step S1426. Otherwise, in case at least one of the first parameter correspondence and the second parameter correspondence cannot positively be verified (i.e., S1≠2 and/or S2≠SH1) by the BSF 124 in step S1424, the BSF 124 sends a warning signal via the user device 102 to the SSD 104 in step S1428.

Figure 15:
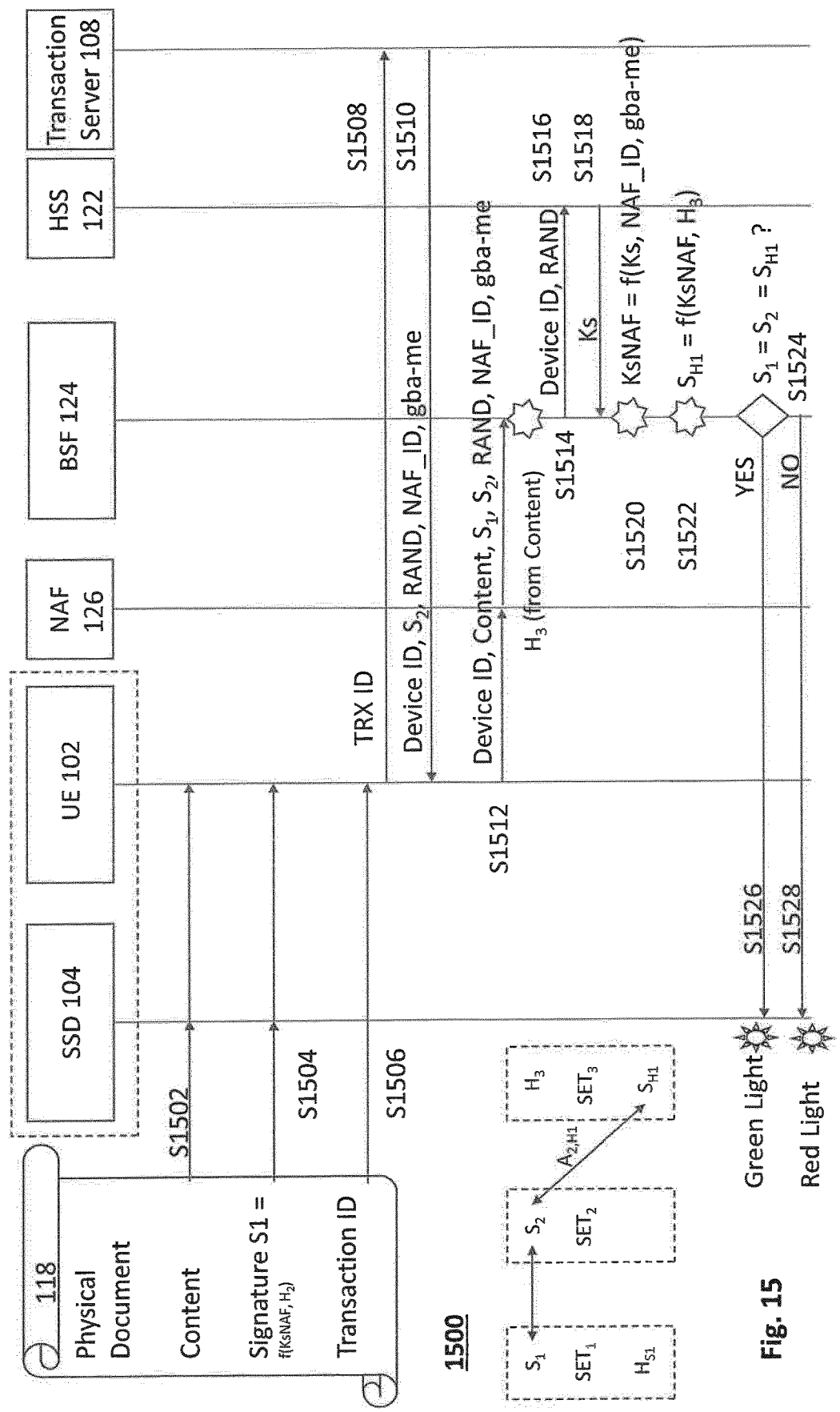

Referring to the signaling diagram 1500 of FIG. 15 for symmetric cryptography, steps S1502 to S1528 substantially correspond to steps S1302 to S1328, respectively, as discussed above in the context of FIG. 13 with the exception that the transaction server 108 returns the signed hash S2 instead of the hash H2 in step 1512, and in that in step S1514 this signed hash S2 is forwarded to the BSF 124. Moreover, in step S1522 the BSF 124 then applies KsNAF to the hash H3 so as to obtain the signed hash SH1 (as also explained with reference to step S1422 of FIG. 14). As such, the BSF 124 will check in step S1524 a first parameter correspondence $A_{1,2}$ between S1 and S2 for parameter sets $SET_1$ and $SET_2$ and second parameter correspondence $A_{2,H1}$ between S2 and SH1 for parameter sets $SET_2$ and $SET_3$, as also illustrated in FIG. 15 and explained above in the context of FIG. 14.

In case the first parameter correspondence and the second parameter correspondence can positively be verified (i.e., S1=S2 and S2=SH1) by the BSF 124 in step S1524, the BSF 124, via the user device 102, sends a confirmation signal to the SSD 104 in step S1526. Otherwise, in case at least one of the first parameter correspondence and the second parameter correspondence cannot positively be verified (i.e., S1≠2 and/or S2≠SH1) by the BSF 124 in step S1424, the BSF 124 sends a warning signal via the user device 102 to the SSD 104 in step S1528.

As has become apparent from the above exemplary embodiments, the technique presented herein provides several advantages. In particular, physical documents can be protected and verified in regard to document authenticity and integrity using existing cryptographic algorithms. The protection and verification procedures can be provided using existing (e.g., mobile communication infrastructure, including GBA/GAA).

It will be appreciated that the present disclosure has been described with reference to exemplary embodiments that may be varied in many aspects. As such, the present invention is only limited by the claims that follow.

The invention claimed is:

1. A device for controlling cryptographic document protection, the device being associated with a device identifier (Device ID) and with a cryptographic key (cK), wherein the device is configured to:
   obtain an electronically processable document representation, EPDR, (H2), of content of a document that is to be protected;
   apply the cryptographic key (cK) to the EPDR (H2) to obtain a cryptographically processed document representation, CPDR, (S2);
   transmit the device identifier (Device ID) and a verification parameter comprising at least one of the EPDR (H2) and the CPDR (S2) towards a transaction server that is configured to log the device identifier (Device ID) and the verification parameter (S2, H2) in a tamper-proof manner;
   receive a transaction identifier (TRX ID) associated with the device identifier (Device ID) and the verification parameter (S2, H2); and
   trigger printing of the transaction identifier (TRX ID) and the CPDR (S2) on a physical document that corresponds to the EPDR (H2).

2. The device of claim 1, wherein:
   the EPDR (H2) is based on one of
     an electronic file that is based on a scan of the physical document generated prior to printing; and
     an electronic file of the document generated by text processing.

3. The device of claim 2, wherein:
   the device comprises a scanner configured to provide the scan of the physical document.

4. The device of claim 2,
   the EPDR (H2) is obtained by applying a cryptographic one-way function to the electronic file or content thereof.

5. The device of claim 4, wherein:
   the cryptographic one-way function is a cryptographic hash function.

6. The device of claim 1, wherein:
   the device comprises a printer configured to print the transaction identifier (TRX ID) and the CPDR (S2) on the physical document.

7. The device of claim 1, wherein:
   the cryptographic key (cK) corresponds to or is derived from a private key (pK) associated with the device.

8. The device of claim 7, wherein:
   the private key (pK) is stored in a tamper-proof memory of the device.

9. The device of claim 7, wherein:
the private key (pK) is obtained from a Network Application Function, NAF, entity acting as Public Key Infrastructure, PKI, portal.

10. The device of claim 1, wherein:
the cryptographic key corresponds to or is derived from a common secret key (Ks, KsNAF) shared between the device and a network entity.

11. The device of claim 10, wherein:
the device is configured to trigger or perform a Generic Boot-strapping Architecture, GBA, procedure to create the common secret key (Ks, KsNAF).

12. The device of claim 11, wherein:
the GBA procedure results in one or more cryptographic parameters (NAF_ID; gba-me) that are to be used by the device to create the common secret key (KsNAF), and wherein the device is further configured to transmit the one or more cryptographic parameters (NAF_ID; gba-me) towards the transaction server.

13. The device of claim 1, wherein:
the device identifier (Device ID) is an Internet Protocol Multimedia Private Identity, IMPI, of the device.

14. The device of claim 1, wherein:
one or more or all of the EPDRs corresponds to one of content of the associated document and content of the associated document to which a cryptographic one-way function has been applied (H2).

15. The device of claim 1, wherein:
one or more or all of the CPDRs corresponds to a signed or encrypted version of the associated EPDR.

16. A method of controlling cryptographic document protection, the method being performed by a device that is associated with a device identifier (Device ID) and with a cryptographic key (private key, KsNAF) and comprising:
obtaining an electronically processable document representation, EPDR (H2), of content of a document that is to be protected;
applying the cryptographic key (private key, KsNAF) to the EPDR (H2) to obtain a cryptographically processed document representation, CPDR (S2);
transmitting the device identifier (Device ID) and a verification parameter comprising at least one of the EPDR (H2) and the CPDR (S2) towards a transaction server that is configured to log the device identifier (Device ID) and the verification parameter (H2, S2) in a tamper-proof manner;
receiving a transaction identifier (TRX ID) associated with the device identifier (Device ID) and the verification parameter (H22, S2); and
triggering printing of the transaction identifier (TRX ID) and the CPDR (S2) on a physical document that corresponds to the EPDR (H2).

* * * * *